(12) United States Patent
Hojo et al.

(10) Patent No.: US 7,092,856 B1
(45) Date of Patent: Aug. 15, 2006

(54) H-INFINITY CONTROLLER DESIGN USING CONTROL OBJECT MODELS

(75) Inventors: Tatsuya Hojo, Tokyo (JP); Atsushi Kurosaki, Tokyo (JP)

(73) Assignee: Yamatake Corporation, Tokyo (JP)

( * ) Notice: Subject to any disclaimer, the term of this patent is extended or adjusted under 35 U.S.C. 154(b) by 887 days.

(21) Appl. No.: 09/857,482

(22) PCT Filed: Oct. 4, 2000

(86) PCT No.: PCT/JP00/06898

§ 371 (c)(1),
(2), (4) Date: Sep. 25, 2001

(87) PCT Pub. No.: WO01/25861

PCT Pub. Date: Apr. 12, 2001

(30) Foreign Application Priority Data

Oct. 5, 1999 (JP) .................................. 11-283978
Oct. 5, 1999 (JP) .................................. 11-283981

(51) Int. Cl.
G06F 7/60 (2006.01)
G06F 17/10 (2006.01)
G05B 13/02 (2006.01)

(52) U.S. Cl. ............................................. 703/2; 700/28
(58) Field of Classification Search ................ 703/2; 700/28
See application file for complete search history.

(56) References Cited

U.S. PATENT DOCUMENTS

| | | | |
|---|---|---|---|
| 5,038,269 A | 8/1991 | Grimble et al. | |
| H001410 H * | 1/1995 | Hartley | 700/28 |
| 5,574,638 A | 11/1996 | Lu | |
| 5,726,879 A | 3/1998 | Sato | |
| 5,859,774 A | 1/1999 | Kuzuya et al. | |
| 6,230,062 B1 * | 5/2001 | Shah | 700/29 |

FOREIGN PATENT DOCUMENTS

| | | |
|---|---|---|
| JP | 8-54906 | 2/1996 |
| JP | 8-328605 | 12/1996 |

OTHER PUBLICATIONS

D. Kavranoglu, S. Al-Amer, M. Bettayeb, New Identification based weighted H infinity norm approximation scheme and its applications to controller reduction, IEEE Jan. 1997, pp. 61-66.*

(Continued)

*Primary Examiner*—Paul L. Rodriguez
*Assistant Examiner*—Dwin M. Craig
(74) *Attorney, Agent, or Firm*—Blakely Sokoloff Taylor & Zafman

(57) ABSTRACT

A design device which designs a controller in accordance with H infinity (H ∞) logic, in which formulae of generalized plants and formulae of control object models which are parts of the generalized plants are stored in a memory unit 3. In a parameter calculating unit including comprising a frequency response calculation unit 4 and a scaling matrix calculation unit 5, the frequency response calculation unit 4 calculates the frequency responses of the control object models, and the scaling matrix calculation unit 5 calculates a scaling matrix T in accordance with the frequency responses of the control object models so that the respective gains of the control object models are consistent. A controller calculation unit 6 calculates the parameters of a controller by applying the scaling matrix T to the generalized plants.

11 Claims, 11 Drawing Sheets

OTHER PUBLICATIONS

J F Whidborne, I Postlethwaite, D-W Gu, "A mixed optimization approach to multiobjective computer-aided control system design", IEEE 1996, pp. 309-314.*

Petter Lundstrom, Sigurd Skogestad, Zi-Qin Wang, "Uncertainty Weight Selection For H-Infinity and Mu-Control Methods", IEEE 1991, pp. 1527-1542.*

M. J. Grimble, "Probabailistic Discrete System Models fo H-Infinity Optimal Control Design", IEEE 1996, pp. 252-257.*

S. Bhattacharya, L.H. Keel, S.P. Bhattacharyya, "Robust Stabilizer Synthesis for Interval Plants using H-Infinity Methods", IEEE 1993, pp. 3003-3008.*

E. Onillon, "Feedback Design Method Review and Comparison", IEEE 1999 pp. 1109-1111.*

H. Imanari, Y. Morimatsu, K. Sekiguchi, H. Ezure, R. Matuoka, A. Tokuda, H. Otobe, "Looper H-Infinity Control for Hot-Strip Milss", IEEE 1997, pp. 790-796.*

P. Coustal, J.M. Michelin, "Industrial Application of an H-Infinity Design Method for Flexible Structures", IEEE 1994, pp. 49-54.*

T.D. Morphopoulos et al. "Convexity of Diagonally Scaled Infinity Norm Optimal Control Problems . . . " Proc. of the 27th Conf. on Decision . Dec. 1988 1341-1342.

M. Dahleh, et al., "Robust Stability / performance of INterconnected . . . " Proc. of the 31st conf. IEEE Dec. 1992, 3168-3174.

Partial Translation of "Hoo Robust Control" from Instrumentation and Control Engineering, Apr. 1998, vol. 41, No. 4, pp. 56-57.

Partial Translation of "Benchmark study of advanced control strategies for distillation processes" from Savemation REview, Aug. 1997, vol. 15, No. 2, p. 7.

* cited by examiner

H-INFINITY CONTROLLER DESIGN USING CONTROL OBJECT MODELS

TECHNICAL FIELD

The present invention relates to a design device which designs a multivariable controller in accordance with H infinity (H ∞) logic.

BACKGROUND ART

In recent years, in the feedback control field, the H ∞ logic has often been utilized which allows the design of a controller in view of an error between an actual control object and a numerical model of the control object. In the conventional control logic, when designing a control system, a control object model that is represented by the transfer function and the state equation is prepared, and the control system is designed to stabilize the model. At this time, when there is an insignificant error between the actual control object and the model, a controller designed to stabilize the model can also stabilize the actual control object. However, when there is a significant error between the actual control object and the model for some reason, the controller may not stabilize the actual control object.

In the H ∞ logic, even if there is an error between the actual control object and the numerical model for use with the design, when the information as to the error can be obtained, the controller for stabilizing the actual control object can be designed in view of the error. It is said that the H ∞ logic is more likely to give the control specification intuitively in designing the control system, as compared with the conventional control logic. For example, in a case of designing a control system using the conventional control logic, its design specification involved a pole in the closed loop system or a weight matrix of evaluation function. However, the physical meanings of these values were unclear, and it required a lot of trial and error to make the settings.

On the contrary, in the H ∞ logic, the control specification can be defined in accordance with the frequency responses of the closed loop system consisting of the control object and the controller. The H ∞ logic has such an advantage, but is theoretically difficult, and has not been put into practical use in the current situation for the reasons of requiring the considerable knowledge to construct the actual control system, and it being difficult to give the control specification to the objects less treatable in accordance with the frequency responses in the process control and so forth.

DISCLOSURE OF THE INVENTION

A control object model used in designing a multivariable control system has a variety of magnitudes of error components ranging from the manipulated variables to controlled variables. In this way, there are various error components of the model to the manipulated variables. In the H ∞ logic, since the controller is designed with reference to the component with a large gain of error, the component with a small gain of error is prone to have a very conservative response, or to be excessively stable. In some cases, it may be required to adjust the weight of control for each controlled variable to avoid the interference between controlled variables. Thus, it is proposed to introduce a manipulated variable weight called a scaling matrix T in order to make the error magnitudes of the control object models consistent and weight the control for the controlled variables. However, in the conventional design method, no general solution was not established to determine the scaling matrix T, resulting in the problem that the scaling matrix T was difficult to suitably choose. Since it was difficult to determine the scaling matrix T, there was another problem that the H ∞ logic was difficult to utilize in the design of the multivariable controller.

Also, in the H ∞ logic, it is required to determine a frequency weight called a sensitivity weight $W_s$ to determine the set value followup characteristic of the closed loop system. However, since the H ∞ logic is a design method in the frequency domain, there was the problem that the design is easy in the control of the mechanical system, but is hard in the control system untreatable in the frequency domain such as the process control, whereby it is difficult to suitably select the sensitivity weight $W_s$. Also, since it is difficult to give the control specification in the frequency domain, and hard to determine the sensitivity weight $W_s$, there was the problem that the H ∞ logic is difficult to utilize in the design of the controller used in the process control field.

As described above, there was conventionally the problem that the H ∞ logic was hard to utilize in the design of the controller.

The present invention has been made in order to solve these problems, and has as its object to provide a design device that can easily design a controller in accordance with the H ∞ logic.

A design device of a controller according to the present invention comprises storage means for storing generalized plants, parameter calculating means for calculating the parameters of the components of the generalized plants in accordance with the response characteristic of a control object model or the response characteristic of a closed loop system consisting of the control object model and the controller, and controller calculation means for calculating the parameters of the controller by applying the parameters to the generalized plants stored in the storage means.

In the design device of the controller according to one arrangement of the invention, the generalized plants have the control object models, and manipulated variable weight adjusting means for adjusting the input of manipulated variables into the control object models, which is provided in the former stage of the control object models, the parameter calculating means comprises frequency response calculation means for calculating the frequency responses of the control object models, and scaling matrix calculation means for calculating a scaling matrix T for determining the weighting of the manipulated variables with the manipulated variable weight adjusting means in accordance with the frequency responses of the control object models so that the respective gains of the control object models are consistent, and the controller calculation means calculates the parameters of the controller by applying the scaling matrix T to the manipulated variable weight adjusting means of the generalized plants stored in the storage means.

Also, in the design device of the controller according to one arrangement of the invention, the generalized plants have a first control object model for the manipulated variables, a second control object model for the disturbance, and manipulated variable weight adjusting means for adjusting the input of manipulated variables into the first control object model, which is provided in the former stage of the first control object model, the parameter calculating means comprises frequency response calculation means for calculating the frequency responses of the first control object model and the second control object model, and scaling matrix calculation means for calculating a scaling matrix T for determining the weighting of the manipulated variables with the manipulated variable weight adjusting means in accordance with the frequency responses of the first and second control object models so that the respective gains of the first control object model are consistent with the maximum value of the gains of the second control object model, and the controller calculation means calculates the parameters of the controller by applying the scaling matrix T to the manipulated variable weight adjusting means of the generalized plants stored in the storage means.

Also, in the design device of the controller according to one arrangement of the invention, the generalized plants stored in the storage means have control variable weight adjusting means for adjusting the controlled variables inside a closed loop system consisting of the manipulated variable weight adjusting means, the control object model for the manipulated variables and the controller, and the design device has setting means for setting a weight matrix S for determining the weighting of the controlled variables with the control variable weight adjusting means.

Also, in the design device of the controller according to one arrangement of the invention, the generalized plants stored in the storage means have control variable weight adjusting means for adjusting the controlled variables in the former or latter stage of frequency sensitivity weight adjusting means to determine the set value followup characteristic of a closed loop system consisting of the manipulated variable weight adjusting means, the control object models for the manipulated variables and the controller, and the design device has setting means for setting a weight matrix S for determining the weighting of the controlled variables with the control variable weight adjusting means.

In the design device of the controller according to one arrangement of the invention, the parameter calculating means has setting means for setting the transient response characteristic of the closed loop system and frequency sensitivity weight calculation means for calculating the frequency sensitivity weight to determine the set value followup characteristic of the closed loop system in accordance with the transient response characteristic of the closed loop system, and the controller calculation means calculates the parameters of the controller by applying the frequency sensitivity weight to the generalized plants stored in the storage means.

In the design device of the controller according to one arrangement of the invention, the frequency sensitivity weight calculation means calculates the frequency sensitivity weight in accordance with the transient response characteristic of the closed loop system, and a design index that the H ∞ norm of a transfer function of the closed loop system from the set value to the deviation, multiplied by the frequency sensitivity weight, is less than 1.

In the design device of the controller according to one arrangement of the invention, the setting means approximates the transient response characteristic of the closed loop system with a first-order lag characteristic.

In the design device of the controller according to one arrangement of the invention, the setting means approximates the transient response characteristic of the closed loop system with a second-order system characteristic.

BEST MODE OF CARRYING OUT THE INVENTION

FIRST EMBODIMENT

Figure 1:
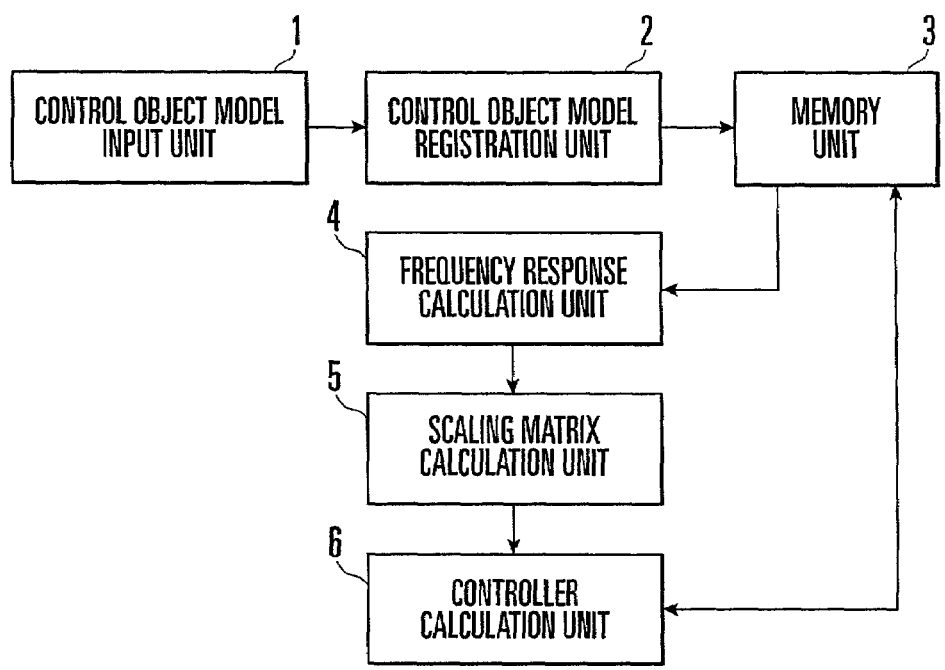
FIG. 1 is a block diagram showing the configuration of a design device of a controller in a first embodiment of the present invention.

The present invention will be described below in detail by way of embodiment with reference to the accompanying drawings. FIG. 1 is a block diagram showing the configuration of a design device of a controller in a first embodiment of the invention. The design device of FIG. 1 comprises a control object model input unit 1 for inputting the parameters of a control object model, a control object model registration unit 2 for registering the model parameters in a memory unit described later, the memory unit 3 for storing formulae of generalized plants and formulae of control object models which are parts of the generalized plants, a frequency response calculation unit 4 for calculating the frequency responses of the control object models, a scaling matrix calculation unit 5 for calculating a scaling matrix T for making consistent the magnitudes of errors of the control object models so that the respective gains of the control object models are consistent with the maximum value of the gains of the control object models, and a controller calculation unit 6 for calculating the parameters of a controller by applying the scaling matrix T to the generalized plants stored in the memory unit 3.

Figure 2:
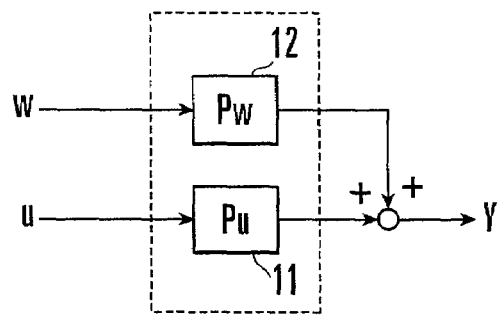
FIG. 2 is a block diagram showing the configuration of a model of an actual control object as represented in the formulae.

An algorithm for designing the controller in accordance with the H ∞ logic is effected based on the generalized plants as represented using the control objects. Therefore, the generalized plants will be first described. FIG. 2 is a block diagram showing the configuration of a model of an actual control object as represented in the formulae. A numerical model of the control object as shown in FIG. 2 is composed of a first control object model 11 for the manipulated variable u and a second control object model 12 for the disturbance w. Reference sign Pu denotes a transfer function of the model 11 and reference sign Pw denotes a transfer function of the model 12. The models 11, 12 are obtained as a result of the model identification using the data obtained by a step response test for the actual control object. The controlled variable y that is the output of control object is a sum of the outputs from the models 11 and 12.

Figure 3:
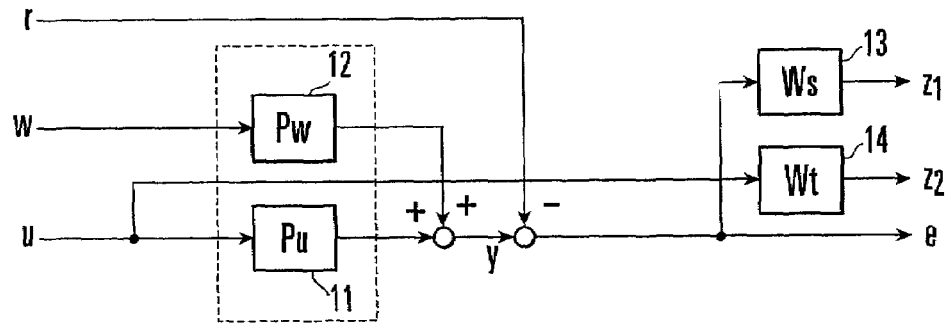
FIG. 3 is a block diagram showing the configuration of the conventional generalized plants.

FIG. 3 shows the configuration of the conventional generalized plants containing such numerical model of control object. The generalized plants involve providing a frequency weight called a sensitivity weight $W_s$ used to determine the set value followup characteristic and a frequency weight called a complementary sensitivity weight $W_t$ used to determine the robust stability, and introducing the set value r, and the outputs z1, z2 in addition to the input (manipulated variable) u of control object, input (disturbance) w, and output (controlled variable) y, to realize both the set value followup characteristic and the robust stability as shown in FIG. 3. Deviation e (=y−r) is an observation quantity or the input into the controller (not shown). Reference numeral 13 denotes a block (frequency sensitivity weight adjusting means) representing the sensitivity weight $W_s$, and reference sign $Z_1$ denotes an output for effecting the evaluation of the set value followup characteristic. Also, reference numeral 14 denotes a block representing the complementary sensitivity weight $W_t$, and reference sign $Z_2$ denotes an output for effecting the evaluation of the robust stability.

Conventionally, in the generalized plants as shown in FIG. 3, the complementary sensitivity weight $W_t$ is determined by estimating the uncertainty of the models on the basis of the numerical models of control objects, and the sensitivity weight $W_s$ is determined by directly specifying the frequency characteristic in view of the followup ability to the set value r, whereby the parameters of the controller are determined through the γ iteration. However, since employing the generalized plant of FIG. 3, the controller is designed on the basis of a larger gain due to differences in the gains for the plant outputs of the manipulated variables, the obtained controller is likely to be very conservative, or excessively stable. Also, since the set value followup characteristic and the disturbance response characteristic are usually reciprocal, it is preferred to design with the weight according to the purpose rather than with the same weight. Further, in the generalized plants of FIG. 3 containing no integral element, some steady-state deviation arises. If the sensitivity weight $W_s$ is provided with the integral characteristic, the controller can have the integral characteristic, but the generalized plants become unstable, not leading to the normal H ∞ problem.

Figure 4:
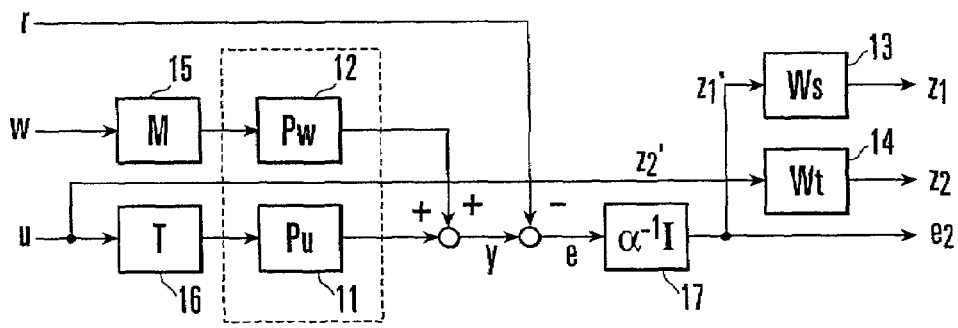
FIG. 4 is a block diagram showing the configuration of the generalized plants for use with the design device of the invention.
Figure 5:
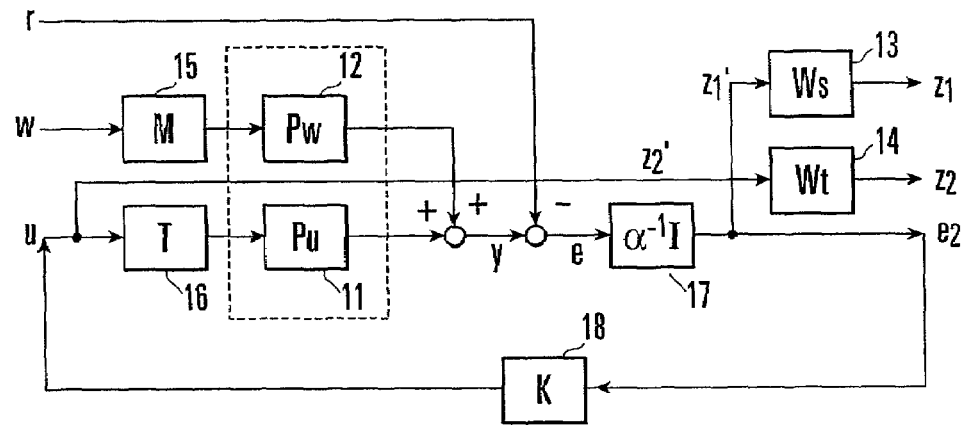
FIG. 5 is a block diagram showing the configuration of a robust control system with a controller added to the generalized plants of FIG. 4.

Therefore, in this embodiment, the generalized plants as shown in FIG. 4 are considered. In FIG. 4, reference sign M denotes a scaling matrix for adjusting the influence of disturbance w on the controlled variable y, reference sign T denotes a scaling matrix for making the magnitude of error of the control object model consistent, and reference sign $\alpha^{-1}I$ denotes a weight for providing the controller with the integral characteristic to eliminate the steady-state deviation. Herein, α(s) is defined as α(s)=s/(s+a). Where s is a Laplace operator, and a (>0) is any real number. Reference numeral 15 denotes a block representing the scaling matrix M, reference numeral 16 denotes a block (manipulated variable weight adjusting means) representing the scaling matrix T, and reference numeral 17 denotes a block representing the weight $\alpha^{-1}I$. Deviation $e_2$ is deviation e multiplied by the weight $\alpha^{-1}I$, and input into the controller. FIG. 5 shows the configuration of a robust control system in which a controller K is added to the above generalized plant. In FIG. 5, reference numeral 18 denotes a block representing the controller K.

The design device of the controller in this embodiment is aimed at determining the parameters of the controller K such that the controlled variable y that is the output of control object follows the set value r, the influence of disturbance w is removed, and the control object is stabilized even if it is fluctuated or there is an error in the model of control object. The H ∞ problem can be regarded as the problem of reducing the H ∞ norm (gain) of the transfer function from (r, w) to ($z_1$, $z_2$). That is, the set value followup characteristic, the robust stability and the disturbance suppression may be considered in the following way.

(A) Set value followup characteristic: If the H ∞ norm (gain) of the transfer function from the set value r to deviation e (more correctly, transfer function with the set value r multiplied by the frequency weight $\alpha^{-1}W_s$ from r to $z_1$) is reduced, the deviation e can be decreased, so that the set value followup characteristic can be made better. Herein, $\alpha^{-1}W_s$ is the frequency weight for restricting the followup band (e.g., followup only in the low band).

(B) Robust stability: There is an error between the actual control object and its model due to characteristic variations of the control object or the error at the time of modeling. The maximum value of the error from the identified model is estimated as Δ(s), and the controller K is designed such that the H ∞ norm from the set value r to $z_2$ is smaller than or equal to 1, employing the complementary sensitivity weight $W_t(s)$ such as |Δ(jω)|<|$W_t$(jω)| for this error, whereby the robust stabilization can be achieved.

(C) Disturbance suppression: If the H ∞ norm (gain) of the transfer function from disturbance w to deviation e (more correctly, transfer function with the disturbance w multiplied by the frequency weight $\alpha^{-1}W_s$ from w to $z_1$) is reduced, the deviation e can be decreased even if the disturbance w enters, whereby the disturbance suppression can be ameliorated.

Next, it is supposed that the state space representation of the generalized plant as shown in FIG. 4 is given by:

$$\dot{x}_p = A_p x_p + B_{p1} Mw + B_{p2} Tu \quad (1)$$

$$y = C_p x_p + D_{p1} Mw + D_{p2} Tu \quad (2)$$

In the above expressions (1) and (2), $x_p$ is the quantity of state, and $A_p$, $B_{p1}$, $B_{p2}$, $C_p$, $D_{p1}$ and $D_{p2}$ are the parameters of the numerical models 11, 12 of control objects. From the expression (2), the deviation e can be obtained in the following expression.

$$e = y - r = C_p x_p + D_{p1} Mw + D_{p2} Tu - r \quad (3)$$

With the configuration of the generalized plant as shown in FIG. 4, the outputs $z_1'$ and $z_2'$ can be defined in the following expressions.

$$z_1' = e_2 \quad (4)$$

$$z_2' = u \quad (5)$$

The frequency weight for providing the controller K with the integral characteristic can be defined in the following expression, using the expression (3).

$$\dot{x}_\alpha = A_\alpha x_\alpha + B_\alpha e \quad (6)$$
$$= A_\alpha x_\alpha + B_\alpha C_p x_p + B_\alpha D_{p1} Mw + B_\alpha D_{p2} Tu - B_\alpha r$$

$$e_2 = C_\alpha x_\alpha + D_\alpha e \quad (7)$$
$$= C_\alpha x_\alpha + D_\alpha C_p x_p + D_\alpha D_{p1} Mw + D_\alpha D_{p2} Tu - D_\alpha r$$

In the expressions (6) and (7), $x_\alpha$ is the quantity of state of $\alpha^{-1}I$, and $A_\alpha$, $B_\alpha$, $C_\alpha$ and $D_\alpha$ are the parameters of $\alpha^{-1}I$. Arranging the above expressions and representing them in a state space, the following three expressions can be obtained.

$$\frac{d}{dt}\begin{bmatrix} x_p \\ x_\alpha \end{bmatrix} = \begin{bmatrix} A_p & 0 \\ B_\alpha C_p & A_\alpha \end{bmatrix}\begin{bmatrix} x_p \\ x_\alpha \end{bmatrix} + \begin{bmatrix} 0 & B_{p1}M & B_{p2}T \\ -B_\alpha & B_\alpha D_{p1}M & B_\alpha D_{p2}T \end{bmatrix}\begin{bmatrix} r \\ w \\ u \end{bmatrix} \quad (8)$$

$$\begin{bmatrix} z_1' \\ z_2' \end{bmatrix} = \begin{bmatrix} D_\alpha C_p & C_\alpha \\ 0 & 0 \end{bmatrix}\begin{bmatrix} x_p \\ x_\alpha \end{bmatrix} + \begin{bmatrix} -D_\alpha & D_\alpha D_{p1}M & D_\alpha D_{p2}T \\ 0 & 0 & I \end{bmatrix}\begin{bmatrix} r \\ w \\ u \end{bmatrix} \quad (9)$$

$$e_2 = \begin{bmatrix} D_\alpha C_p & C_\alpha \end{bmatrix}\begin{bmatrix} x_p \\ x_\alpha \end{bmatrix} + \begin{bmatrix} -D_\alpha & D_\alpha D_{p1}M & D_\alpha D_{p2}T \end{bmatrix}\begin{bmatrix} r \\ w \\ u \end{bmatrix} \quad (10)$$

Representing the expressions (8), (9) and (10) in Doile's notation, the following expressions can be obtained.

$$G(s) = \begin{bmatrix} A & B_1 & B_2 \\ C_1 & D_{11} & D_{12} \\ C_2 & D_{21} & D_{22} \end{bmatrix} \quad (11)$$

Parameter A can be represented as follows:

$$A = \begin{bmatrix} A_p & 0 \\ B_\alpha C_p & A_\alpha \end{bmatrix} \quad (12)$$

Parameter $B_1$ and $B_2$ can be represented as follows:

$$B_1 = \begin{bmatrix} 0 & B_{p1}M \\ -B_\alpha & B_\alpha D_{p1}M \end{bmatrix},\ B_2 = \begin{bmatrix} B_{p2}T \\ B_\alpha D_{p2}T \end{bmatrix} \quad (13)$$

Also, parameters $C_1$ and $C_2$ can be represented as follows:

$$C_1 = \begin{bmatrix} D_\alpha C_p & C_\alpha \\ 0 & 0 \end{bmatrix},\ C_2 = \begin{bmatrix} D_\alpha C_p & C_\alpha \end{bmatrix} \quad (14)$$

And the parameters $D_{11}$, $D_{12}$, $D_{21}$, $D_{22}$ can be represented as follows:

$$D_{11} = \begin{bmatrix} -D_\alpha & D_\alpha D_{p1}M \\ 0 & 0 \end{bmatrix},\ D_{12} = \begin{bmatrix} D_\alpha D_{p2}T \\ I \end{bmatrix} \quad (15)$$
$$D_{21} = \begin{bmatrix} -D_\alpha & D_\alpha D_{p1}M \end{bmatrix},\ D_{22} = D_\alpha D_{p2}T$$

The sensitivity weight $W_s$ and the complementary sensitivity weight $W_t$ are designed, and multiplied by the output parts of the expression (11). Through $\gamma$ iteration, the controller K is obtained in the state space representation. Herein, the output parts of the expression (11) signify the parts corresponding to the outputs $z_1'$, $z_2'$ in FIG. 4. Hence, an output equation of the parameters $C_1$, $D_{11}$, $D_{12}$ of the expression (11) may be multiplied by a diagonal matrix Q as represented in the following expression having the diagonal elements of sensitivity weight $W_s$ and complementary sensitivity weight $W_t$ from the left side. Thus, the parameters of the controller K can be calculated.

$$Q = \begin{bmatrix} W_s & 0 \\ 0 & W_t \end{bmatrix} \quad (16)$$

Figure 6:
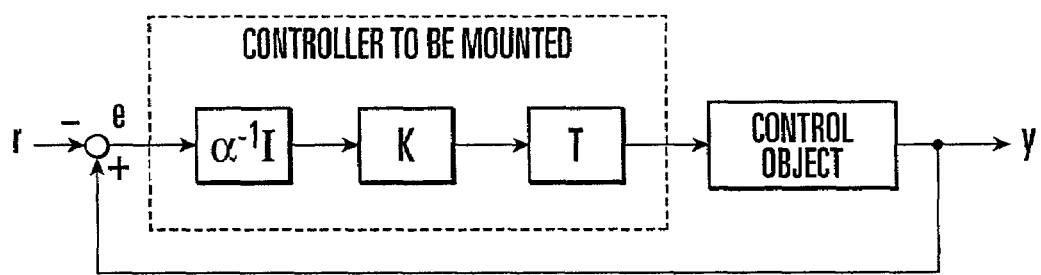
FIG. 6 is a block diagram showing the configuration of an actual controller containing the controller designed using the design device in the first embodiment of the invention.

The controller K is a solution of the H $\infty$ control problem with the generalized plants, and the actual controller mounted on the plants such as a distillation tower is the controller K multiplied by weight $\alpha^{-1}I$ and scaling matrix T, as shown in FIG. 6.

Figure 7:
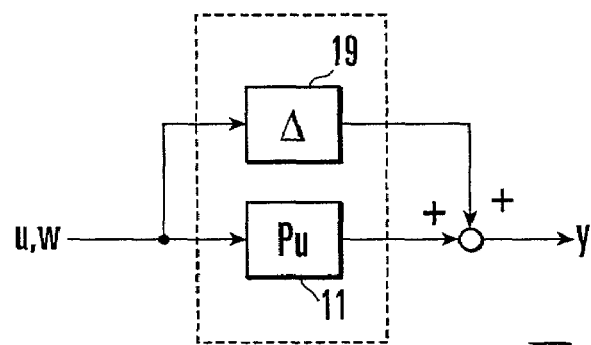
FIG. 7 is a block diagram showing an additive error in a numerical model of the control object.

Next, a method for determining the complementary sensitivity weight $W_t$ in this embodiment will be described below. The control object is varied in the characteristics, depending on the driving conditions. Normally, the control design is made based on a certain model, but in the robust control design, the variation of control object and the magnitude of error of modeling are contained beforehand in the control design, and the controller is designed to be stable without much deterioration in the control performance even if there is any variation or error. FIG. 7 shows an additive error for the model 11 of control object. In FIG. 7, reference numeral 19 denotes a block representing the additive error Δ. In the robust control design, a variation in the characteristic of the control object owing to the driving conditions and a model error due to lower dimension of the model 11 are represented as the additive error Δ as shown in FIG. 7. If the characteristics of the control object are deviated from the model 11 due to this additive error Δ, the controller is designed such that the controller output may be stable. To this end, the complementary sensitivity weight $W_t$ may be determined to cover the additive error Δ. The general expression of this complementary sensitivity weight $W_t$ is shown in the following expression. Since the change of the model 12 is not related with the stability of the system, it is supposed that the model 11 alone is varied in designing the controller.

$$W_t = \begin{bmatrix} W_{t1} & 0 & 0 & \cdots & 0 \\ 0 & W_{t2} & 0 & \cdots & 0 \\ 0 & 0 & W_{t3} & \cdots & 0 \\ \vdots & \vdots & \vdots & \ddots & \vdots \\ 0 & 0 & 0 & \cdots & W_{tN} \end{bmatrix} \quad (17)$$

In this embodiment, for the additive error Δ with scaled magnitude, employing the scaling matrix T, the element of the complementary sensitivity weight $W_t$ is the maximum value Gmax of the gains of error Δ multiplied by a safety factor δ (δ is equal to 1, for example). Namely, the elements (weights) $W_{t1}$, $W_{t2}$, $W_{t3}$, ..., $W_{tN}$ are defined as follows.

$$W_{t1} = W_{t2} = W_{t3} = W_{tN} = (1+\delta)G \max \quad (18)$$

This embodiment is involved with the multivariable control system, and assuming that the number of manipulated variables u is N (N is a positive integer), the complementary sensitivity weight $W_t$ is N×N matrix. Where $W_{tN}$ is the weight for the N-th manipulated variable $u_N$.

Next, a method for determining the sensitivity weight $W_s$ in this embodiment will be described below. First of all, a general expression of the sensitivity weight $W_s$ is shown in the following expression.

$$W_s = \begin{bmatrix} W_{s1} & 0 & 0 & \cdots & 0 \\ 0 & W_{s2} & 0 & \cdots & 0 \\ 0 & 0 & W_{s3} & \cdots & 0 \\ \vdots & \vdots & \vdots & \ddots & \vdots \\ 0 & 0 & 0 & \cdots & W_{sL} \end{bmatrix} \quad (19)$$

Figure 8:
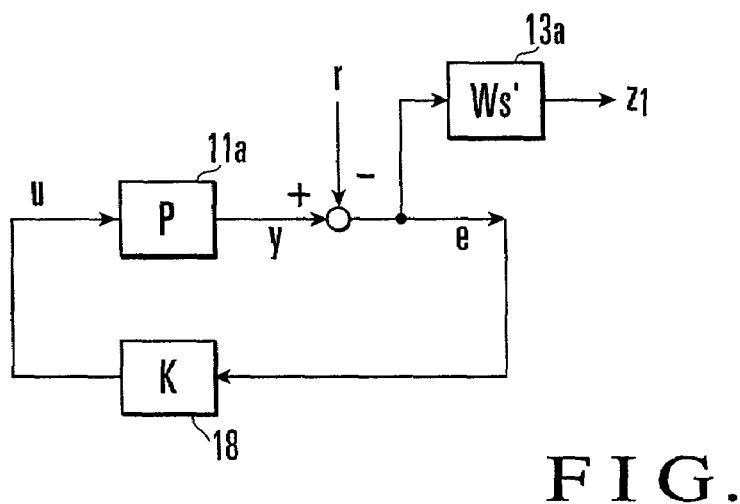
FIG. 8 is a block diagram showing the configuration of a closed loop system used in determining the sensitivity weight.

Assuming that the number of controlled variables y is L (L is a positive integer), the sensitivity weight $W_s$ is L×L matrix. Element $W_{sL}$ of the sensitivity weight $W_s$ is the weight for the L-th controlled variable $y_L$. In order to determine the sensitivity weight $W_s$, a closed loop system of FIG. 8 in which the robust control system of FIG. 5 is simplified is considered. In FIG. 8, reference numeral 11a denotes a block representing a numerical model P of control object, and reference numeral 13a denotes a block representing the frequency weight $W_s'$. Supposing that the sensitivity function indicating the control performance mainly regarding the quick-response property such as the set value followup ability or disturbance suppression is S(s), the smaller gain |S(jω)| of the sensitivity function S(s) is preferable because the model variations have less effect on the set value response. If the control specification at each frequency is given by $S_{spec}(\omega)$, the following condition concerning the sensitivity function S(s) can be obtained.

$$|S(j\omega)| < S_{spec}(\omega); \forall \omega \quad (20)$$

Where ∀ω means that the expression (20) holds for all frequencies ω. Employing this sensitivity function S(s), the design index of the controller K in view of the set value followup characteristic is as follows:

$$\|W_{sL}'(s)S(s)\|_\infty < 1 \quad (21)$$

The frequency weight $W_{sL}'$ (s) is $W_{sL}$ (s) multiplied by $\alpha^{-1}$ (s), and is defined as follows:

$$W_{sL}'(s) = \alpha^{-1}(s)W_{sL}(s) \quad (22)$$

The expression (21) indicates that the H ∞ norm of the transfer function of the closed loop system of FIG. 8 from the set value r to the deviation e (more correctly, the transfer function with the set value r multiplied by the frequency weight $\alpha^{-1}(s)$ $W_{sL}$ (s) from r to $z_1$) is less than 1. By setting the weight $W_{sL}(s)$ to satisfy this expression (21), the controller K can be designed in view of the set value followup characteristic.

Next, a method for determining the scaling matrix M will be described below. A general expression of the scaling matrix M is shown in the following expression.

$$M = \begin{bmatrix} M_1 & 0 & 0 & \cdots & 0 \\ 0 & M_2 & 0 & \cdots & 0 \\ 0 & 0 & M_3 & \cdots & 0 \\ \vdots & \vdots & \vdots & \ddots & \vdots \\ 0 & 0 & 0 & \cdots & M_J \end{bmatrix} \quad (23)$$

Assuming that the number of disturbance w is J (J is a positive integer), the scaling matrix M is J×J matrix. Element $M_J$ of the scaling matrix M is the weight for the J-th disturbance $w_J$, with the initial value being 1. Each element $M_J$ is an adjustment parameter for determining the disturbance suppression performance by adjusting the influence of each disturbance $w_J$ on the controlled variable y. That is, when the suppression of the particular disturbance w is desired to be intensified, the element $M_J$ concerning this disturbance w is made larger than 1.

Next, a method for determining the scaling matrix T in this embodiment will be described below. A general expression of the scaling matrix T is shown in the following expression.

$$T = \begin{bmatrix} T_1 & 0 & 0 & \cdots & 0 \\ 0 & T_2 & 0 & \cdots & 0 \\ 0 & 0 & T_3 & \cdots & 0 \\ \vdots & \vdots & \vdots & \ddots & \vdots \\ 0 & 0 & 0 & \cdots & T_N \end{bmatrix} \quad (24)$$

Assuming that the number of manipulated variables u is N (N is a positive integer), the scaling matrix T is N×N matrix. Element $T_N$ of the scaling matrix T is the weight for the N-th manipulated variable $u_N$. Each element $T_N$ is determined such that the magnitudes of the gains of the control object model 11 are as equal as possible. More specifically, each element $T_N$ is determined as follows:

$$T_N = \frac{1}{L} \cdot \frac{\max(\|G_{y1u1}\|_\infty, \|G_{y1u2}\|_\infty, \ldots, \|G_{y1uN}\|_\infty)}{\|G_{y1uN}\|_\infty} + \frac{1}{L} \cdot \frac{\max(\|G_{y2u1}\|_\infty, \|G_{y2u2}\|_\infty, \ldots, \|G_{y2uN}\|_\infty)}{\|G_{y2uN}\|_\infty} + \ldots + \frac{1}{L} \cdot \frac{\max(\|G_{yLu1}\|_\infty, \|G_{yLu2}\|_\infty, \ldots, \|G_{yLuN}\|_\infty)}{\|G_{yLuN}\|_\infty} \quad (25)$$

In the expression (25), $G_{yLuN}$ is the transfer function of the control object model 11 of FIG. 4 from the N-th manipulated variable $u_N$ to the L-th controlled variable $y_L$, and $\|G_{yLuN}\|\infty$ is the H ∞ norm (gain) of the same transfer function. max ($\|G_{yLu1}\|\infty$, $\|G_{yLu2}\|\infty$, ..., $\|G_{yLuN}\|\infty$) means to select the maximum value from among the H ∞ norms $\|G_{yLu1}\|\infty$, $\|G_{yLu2}\|\infty$, ..., and $\|G_{yLuN}\|\infty$. To obtain the H ∞ norm $\|G_{yLuN}\|\infty$, the model 11 as presented in the state equation representation may be transformed into the transfer function representation given by the following expression, and the gain of each frequency may be calculated from this transfer function.

$$\begin{bmatrix} y_1 \\ y_2 \\ y_3 \\ \vdots \\ y_L \end{bmatrix} = \begin{bmatrix} G_{y1u1} & G_{y1u2} & G_{y1u3} & \cdots & G_{y1uN} \\ G_{y2u1} & G_{y2u2} & G_{y2u3} & \cdots & G_{y2uN} \\ G_{y3u1} & G_{y3u2} & G_{y3u3} & \cdots & G_{y3uN} \\ \vdots & \vdots & \vdots & \ddots & \vdots \\ G_{yLu1} & G_{yLu2} & G_{yLu3} & \cdots & G_{yLuN} \end{bmatrix} \begin{bmatrix} u_1 \\ u_2 \\ u_3 \\ \vdots \\ u_N \end{bmatrix} \quad (26)$$

Thereby, the H ∞ norm $\|G_{yLuN}\|\infty$ can be obtained for each of the manipulated variables u and the controlled variables y, and the element $T_N$ of the scaling matrix T can be obtained from the expression (25).

Figure 9A:
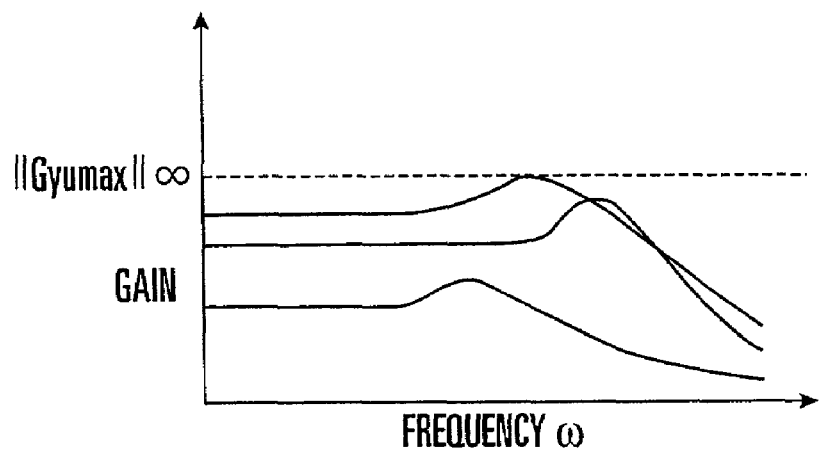
FIG. 9 is a graph for explaining the operation of a scaling matrix in the first embodiment of the invention.

Referring now to FIG. 9, the operation of the scaling matrix T will be described below. FIG. 9A shows the gain characteristic of the control object model 11 (frequency response characteristic of the model 11). In FIG. 9, three sorts of gain characteristic are only shown to simplify the description, but if the number of manipulated variables u is N and the number of controlled variables y is L, N×L sorts of gains exist. As shown in FIG. 9A, in the case where there is no scaling matrix T, it will be found that the gains of the control object model 11 are inconsistent. In general, if the gains of the control object model are inconsistent, the magnitudes of the errors of the control object model are correspondingly inconsistent. Since the complementary sensitivity weight $W_t$ is determined to cover the additive error Δ, as previously described, it follows that the controller is designed on the basis of the model with larger error, whereby the controller obtained is likely to be very conservative, or excessively stable.

Figure 9B:
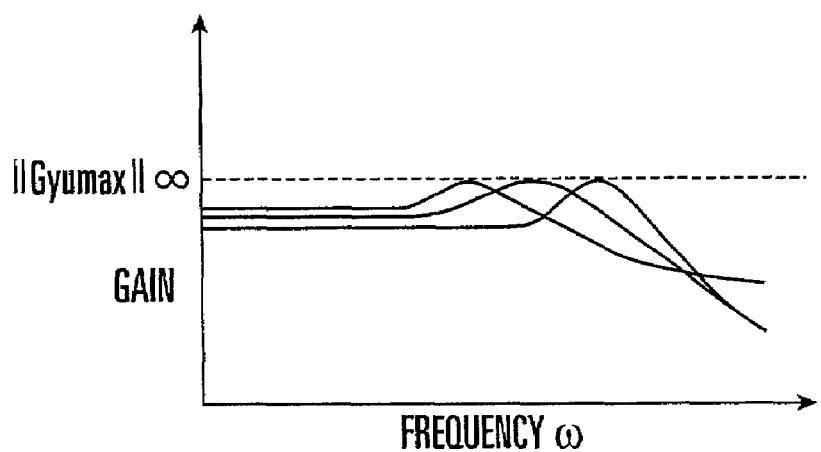

Thus, the magnitudes of the gains are made consistent, employing the scaling matrix T. FIG. 9B shows the gain characteristic of the control object model 11 in the case where the scaling matrix T of this embodiment is provided. $\|G_{yumax}\|\infty$ is the maximum value of the gains of the model 11. As will be clear from FIG. 9B, the method for determining the scaling matrix T of this embodiment as shown in the expressions (24) and (25) involves determining the scaling matrix T such that the gains are consistent with the gain maximum value $\|G_{yumax}\|\infty$ (more correctly, the approximation of the gain maximum value) of the model 11.

Referring now to FIG. 1, the above operation will be described below. The parameters of the control object model 11 are set in the control object model input unit 1 by the user of the design device. The control object model registration unit 2 registers the parameters input from the control object model input unit 1 into the formulae of the control object model stored beforehand in the memory unit 3. The control object model input unit 1 and the control object model registration unit 2 constitute model setting means for setting the control object model. The memory unit 3 stores the formulae of the generalized plants of FIG. 4 and the formulae of the control object models that are parts of the generalized plants, as described in the expressions (1) to (15). The frequency response calculation unit 4 transforms the model 11 as presented in the state equation representation which is registered in the memory unit 3 into the transfer function representation, and calculates the gain at each frequency from the transfer function. Subsequently, the scaling matrix calculation unit 5 calculates the scaling matrix T, employing the expressions (24) and (25), on the basis of the gains calculated in the frequency response calculation unit 4, and outputs it to the controller calculation unit 6. The controller calculation unit 6 registers the scaling matrix T in the formulae of the generalized plants stored in the memory unit 3, and through γ iteration, calculates the parameters of the controller K. At this time, the complementary sensitivity weight $W_t$, the sensitivity weight $W_s$ and the scaling matrix M are preset in the generalized plants in the memory unit 3. In this way, the controller K can be designed.

As previously described, the conventional method has no general way of determining the scaling matrix T, and empirically determined the scaling matrix T. On the contrary, in this embodiment, the scaling matrix T is calculated, in accordance with the frequency responses of the control object models 11, such that the respective gains of the control object models are consistent with the gain maximum value (more correctly, the approximation of the gain maximum value) of the control object model 11. Hence, the scaling matrix T can be easily determined. In this way, the multivariable controller can be easily designed in accordance with the H ∞ logic which is superior in the set value followup characteristic, and capable of stabilizing the controller even when the control objects are varied or the control object models 11 have some error. Consequently, the multivariable control system can be easily designed in view of the variations of the control objects and the uncertainty of the numerical models. Also, the multivariable controller can be realized utilizing the features of the H ∞ control with smaller computational load during execution of the control, and with which the small-scale control system can be implemented.

In this embodiment, the scaling matrix T is determined such that the respective gains of the control object models are consistent with the gain maximum value (more correctly, the approximation of the maximum value) of the control object model 11, but the scaling matrix T may be determined such that the respective gains are consistent with the gain minimum value or gain average value of the control object model 11. To make the respective gains consistent with the gain minimum value (more correctly, the approximation of the minimum value), max in the expression (25) may be replaced with min for selecting the minimum value of $\|G_{yLu1}\|\infty$, $\|G_{yLu2}\|\infty$, ..., and $\|G_{yLuN}\|\infty$. And to make the respective gains consistent with the gain average value (more correctly, the approximation of the average value), max in the expression (25) may be replaced with E for acquiring the average value of $\|G_{yLu1}\|\infty$, $\|G_{yLu2}\|\infty$, ..., and $\|G_{yLuN}\|\infty$.

SECOND EMBODIMENT

In the first embodiment, the disturbance w is not considered, but the control object model for the disturbance w may be obtained. Thus, in this second embodiment, a method for determining the scaling matrix T in view of the influence of disturbance w in such a case will be described below. In this second embodiment, the general expression of the scaling matrix T can be given by the expression (24) in the same manner as in the first embodiment.

And in this second embodiment, each element $T_N$ of the scaling matrix T is determined in the following expression.

$$T_N = \frac{1}{L} \cdot \frac{\max(\|G_{y1w1}\|_\infty, \|G_{y1w2}\|_\infty, ..., \|G_{y1wJ}\|_\infty)}{\|G_{y1uN}\|_\infty} + \frac{1}{L} \cdot \frac{\max(\|G_{y2w1}\|_\infty, \|G_{y2w2}\|_\infty, ..., \|G_{y2wJ}\|_\infty)}{\|G_{y2uN}\|_\infty} + \cdots + \frac{1}{L} \cdot \frac{\max(\|G_{yLw1}\|_\infty, \|G_{yLw2}\|_\infty, ..., \|G_{yLwJ}\|_\infty)}{\|G_{yLuN}\|_\infty} \quad (27)$$

In the expression (27), $G_{yLwJ}$ is the transfer function of the control object model 12 of FIG. 4 from the J-th disturbance $w_j$ to the L-th controlled variable $y_L$, and $\|G_{yLwJ}\|\infty$ is the H ∞ norm (gain) of the same transfer function. max ($\|G_{yLw1}\|\infty$, $\|G_{yLw2}\|\infty$, ..., $\|G_{yLwJ}\|\infty$) means to select the maximum value from the H ∞ norms $\|G_{yLw1}\|\infty$, $\|G_{yLw2}\|\infty$, ..., and $\|G_{yLwJ}\|\infty$. To obtain the H ∞ norm $\|G_{yLwJ}\|\infty$, the model 12 as presented in the state equation representation may be transformed into the transfer function representation as in the following expression, and the gain of each frequency may be calculated from this transfer function.

$$\begin{bmatrix} y_{w1} \\ y_{w2} \\ y_{w3} \\ \vdots \\ y_{wL} \end{bmatrix} = \begin{bmatrix} G_{y1w1} & G_{y1w2} & G_{y1w3} & \cdots & G_{y1wJ} \\ G_{y2w1} & G_{y2w2} & G_{y2w3} & \cdots & G_{y2wJ} \\ G_{y3w1} & G_{y3w2} & G_{y3w3} & \cdots & G_{y3wJ} \\ \vdots & \vdots & \vdots & \ddots & \vdots \\ G_{yLw1} & G_{yLw2} & G_{yLw3} & \cdots & G_{yLwJ} \end{bmatrix} \begin{bmatrix} w_1 \\ w_2 \\ w_3 \\ \vdots \\ w_J \end{bmatrix} \quad (28)$$

In the expression (28), $y_{wL}$ is the output of the control object model 12 for the disturbance w. Thereby, the H ∞ norm $\|G_{yLwJ}\|\infty$ can be obtained for each of the disturbance w and the controlled variables y, and the element $T_N$ of the scaling matrix T can be obtained from the expression (27).

Figure 10A:
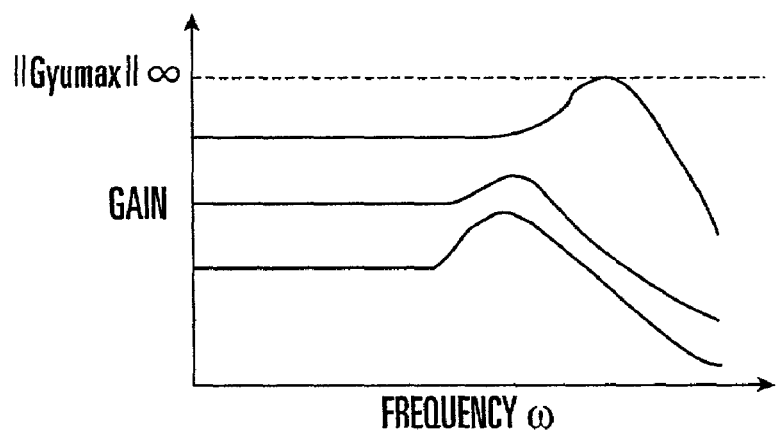
FIG. 10 is a graph for explaining the operation of a scaling matrix in a second embodiment of the invention.

Referring now to FIG. 10, the operation of the scaling matrix T will be described below. FIG. 10A shows the gain characteristic of the control object model 12 (frequency response characteristic of the model 12). In FIG. 10A, three sorts of gain characteristic are only shown to simplify the description, but if the number of disturbance w is J and the number of controlled variables y is L, J×L sorts of gain exist. $\|G_{ywmax}\|\infty$ is the maximum value of the gains of the model 12.

Figure 10B:
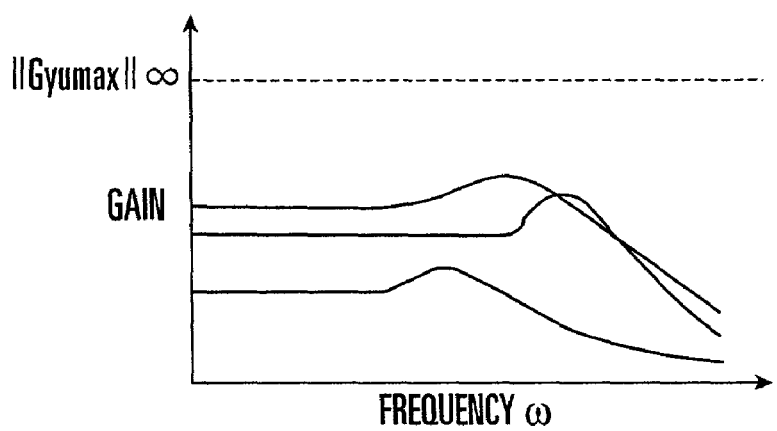

On the other hand, FIG. 10B shows the gain characteristic of the control object model 11. As shown in FIG. 10B, it will be found that the gain maximum value of the control object model 12 and the gains of the control object model 11 are inconsistent.

Figure 10C:
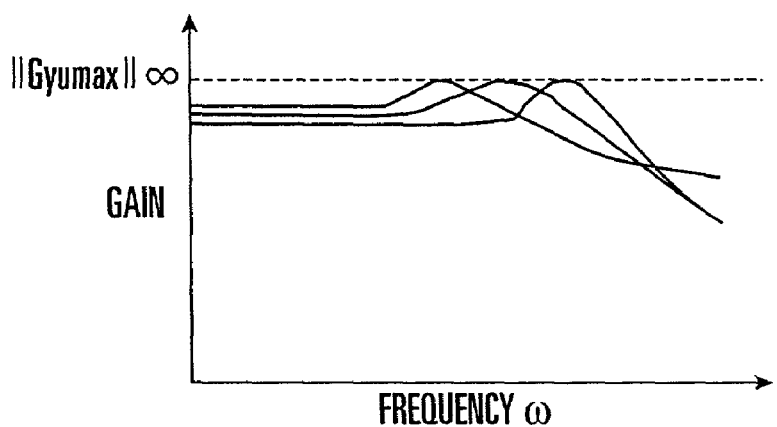

FIG. 10C shows the gain characteristic of the control object model 11 in the case where the scaling matrix T of this embodiment is provided. As will be clear from FIG. 10C, the method for determining the scaling matrix T of this embodiment as shown in the expressions (24) and (27) involves determining the scaling matrix T such that the respective gains of the model 11 are consistent with the gain maximum value $\|G_{ywmax}\|\infty$ (more correctly, the approximation of the gain maximum value) of the model 12.

The scaling matrix T for the manipulated variable u is included in the closed loop system in mounting the controller. Accordingly, there is a meaning in making the magnitudes of the gains of the model 11 consistent, and it is not necessarily of importance with which the gain from the manipulated variable u to the controlled variable y is consistent. The previous first embodiment illustrates one instance with which the respective gains of the control object models are consistent. On the contrary, in this second embodiment, because the input of disturbance is considered, it is necessary that the influence of the input disturbance w is suppressed by the manipulated variable u from the viewpoint of suppressing the disturbance w. Thus, in this second embodiment, to cope with the worst situation, the scaling matrix T is determined such that the gains of the model 11 are consistent with the gain maximum value $\|G_{ywmax}\|\infty$ (more correctly, the approximation of the gain maximum value) of the model 12.

In this second embodiment, the configuration of the design device is almost equivalent to that of the first embodiment. Thus, the operation of the design device of this second embodiment will be described below with reference to FIG. 1.

The parameters of the control object model (model 11, 12 in this second embodiment) are set in the control object model input unit 1 by the user of the design device. The control object model registration unit 2 registers the parameters input from the control object model input unit 1 into the formulae of the control object model stored beforehand in the memory unit 3. The frequency response calculation unit 3 transforms the model 11, 12 as presented in the state equation representation which is registered in the memory unit 3 into the transfer function representation, and calculates the gain at each frequency from the transfer function. Subsequently, the scaling matrix calculation unit 5 calculates the scaling matrix T, employing the expressions (24) and (27), on the basis of the gain calculated in the frequency response calculation unit 4, and outputs it to the controller calculation unit 6. The operation of the controller calculation unit 6 is exactly the same as in the first embodiment. In this way, the controller K can be designed.

As described above, in this second embodiment, the scaling matrix T is calculated, on the basis of the frequency response of the first and second control object models 11, 12, such that the respective gains of the first control object model 11 are consistent with the maximum value of the gains of the second control object model 12. Hence, the scaling matrix T can be easily determined. Thereby, the multivariable controller can be easily designed in accordance with the H ∞ logic which is superior in the set value followup characteristic and disturbance suppression, and capable of stabilizing even when the control object is varied or the control object model has some error.

THIRD EMBODIMENT

In the first and second embodiments, the magnitudes of the gains of the model are made consistent by the scaling matrix T, so that the weights of control for the controlled variables are even. However, in practice, there is the problem that the controlled variables y interfere with each other in the control, and the control is unstable, whereby it may be sometimes required to coordinate the weights of control for the controlled variables. Thus, in this second embodiment, a weight matrix S is introduced to weight the controlled variables y directly.

Figure 11:
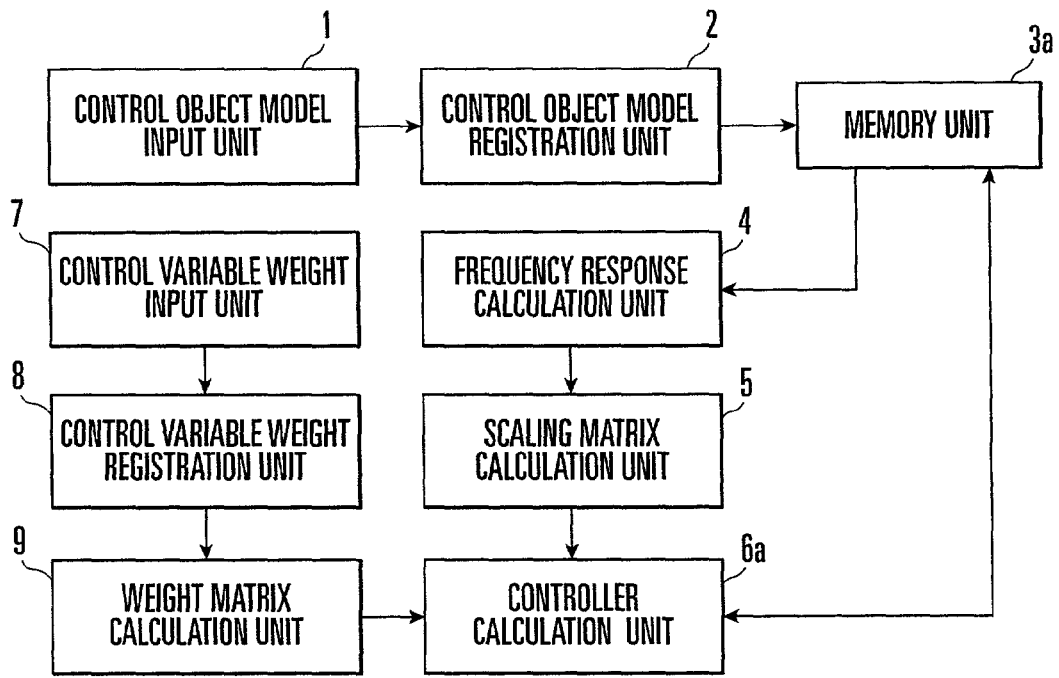
FIG. 11 is a block diagram showing the configuration of a design device of a controller in a third embodiment of the present invention.
Figure 12:
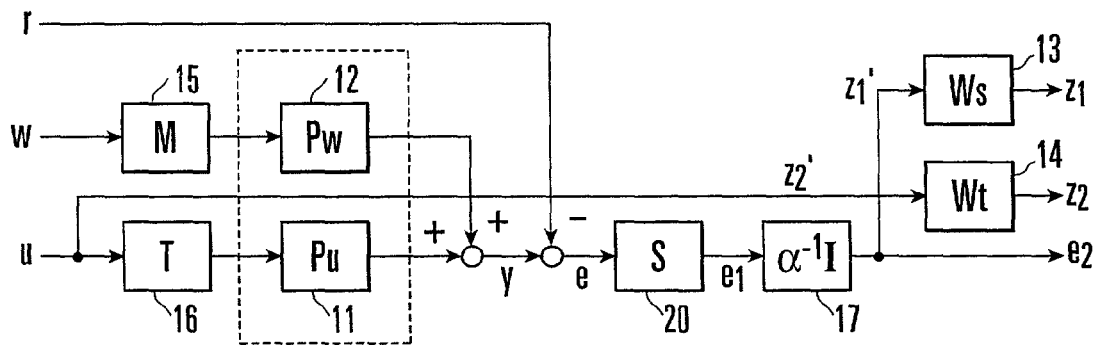
FIG. 12 is a block diagram showing the configuration of the generalized plants in the third embodiment of the present invention.

FIG. 11 is a block diagram showing the configuration of a design device of a controller in a third embodiment of the present invention. FIG. 12 is a block diagram showing the configuration of the generalized plant in this third embodiment. The design device of FIG. 11 is the design device of the first or second embodiment as shown in FIG. 1, comprising additionally a control variable weight input unit 7 for inputting the weight for the controlled variable y, a control variable weight registration unit 8 for registering the control variable weight in the device, and a weight matrix calculation unit 9 for calculating the weight matrix S based on the control variable weight. Also, the generalized plant of FIG. 12 is the generalized plant of the first or second embodiment as shown in FIG. 4, with a block (control variable weight adjusting means) 20 representing the weight matrix S. In this embodiment, the control variable weight adjusting means 20 (weight matrix S) is provided inside a closed loop system composed of the manipulated variable weight adjusting means 16 (scaling matrix T), the control object model 11 and the controller K. A general expression of the weight matrix S is shown in the following expression.

$$S = \begin{bmatrix} S_1 & 0 & 0 & \cdots & 0 \\ 0 & S_2 & 0 & \cdots & 0 \\ 0 & 0 & S_3 & \cdots & 0 \\ \vdots & \vdots & \vdots & \ddots & \vdots \\ 0 & 0 & 0 & \cdots & S_L \end{bmatrix} \quad (29)$$

Assuming that the number of controlled variables y is L (L is a positive integer), the weight matrix S is L×L matrix. Element $S_L$ Of the weight matrix S is the weight for the L-th controlled variable $y_L$. Each element $S_L$ is determined in the following expression.

$$S_L = \frac{W_{yL}}{\max(W_{y1}, W_{y2}, \cdots, W_{yL})} \quad (30)$$

In the expression (30), $W_{yL}$ is the control variable weight for the L-th controlled variable $y_L$. In this way, each controlled variable can be directly weighted by the weight matrix S.

Next, in this third embodiment, the configuration of the generalized plant is modified as shown in FIG. 12, so that the following expression can hold.

$$e_1 = Se \quad (31)$$

From the expressions (31) and (3), the expressions (6) and (7) can be rewritten in the following expression.

$$\begin{aligned} \dot{x}_\alpha &= A_\alpha x_\alpha + B_\alpha e_1 \\ &= A_\alpha x_\alpha + B_\alpha SC_p x_p + B_\alpha SD_{p1} Mw + B_\alpha SD_{p2} Tu - B_\alpha Sr \end{aligned} \quad (32)$$

$$\begin{aligned} e_2 &= C_\alpha x_\alpha + D_\alpha e \\ &= C_\alpha x_\alpha + D_\alpha SC_p x_p + D_\alpha SD_{p1} Mw + D_\alpha SD_{p2} Tu - D_\alpha Sr \end{aligned} \quad (33)$$

Thereby, the expressions (8), (9) and (10) can be rewritten in the following expression.

$$\frac{d}{dt}\begin{bmatrix} x_p \\ x_\alpha \end{bmatrix} = \begin{bmatrix} A_p & 0 \\ B_\alpha SC_p & A_\alpha \end{bmatrix}\begin{bmatrix} x_p \\ x_\alpha \end{bmatrix} + \begin{bmatrix} 0 & B_{p1}M & B_{p2}T \\ -B_\alpha S & B_\alpha SD_{p1}M & B_\alpha SD_{p2}T \end{bmatrix}\begin{bmatrix} r \\ w \\ u \end{bmatrix} \quad (34)$$

$$\begin{bmatrix} z_1' \\ z_2' \end{bmatrix} = \begin{bmatrix} D_\alpha SC_p & C_\alpha \\ 0 & 0 \end{bmatrix}\begin{bmatrix} x_p \\ x_\alpha \end{bmatrix} + \begin{bmatrix} -D_\alpha S & D_\alpha SD_{p1}M & D_\alpha SD_{p2}T \\ 0 & 0 & I \end{bmatrix}\begin{bmatrix} r \\ w \\ u \end{bmatrix} \quad (35)$$

$$e_2 = [D_\alpha SC_p \quad C_\alpha]\begin{bmatrix} x_p \\ x_\alpha \end{bmatrix} + [-D_\alpha S \quad D_\alpha SD_{p1}M \quad D_\alpha SD_{p2}T]\begin{bmatrix} r \\ w \\ u \end{bmatrix} \quad (36)$$

Representing the expressions (34), (35) and (36) in the Doile's notation as in the expression (11), the parameter A in the expression (11) can be represented as follows:

$$A = \begin{bmatrix} A_p & 0 \\ B_\alpha SC_p & A_\alpha \end{bmatrix} \quad (37)$$

The parameters $B_1$ and $B_2$ can be represented in the following expression.

$$B_1 = \begin{bmatrix} 0 & B_{p1}M \\ -B_\alpha S & B_\alpha SD_{p1}M \end{bmatrix}, B_2 = \begin{bmatrix} B_{p2}T \\ B_\alpha SD_{p2}T \end{bmatrix} \quad (38)$$

The parameters $C_1$ and $C_2$ can be represented in the following expression.

$$C_1 = \begin{bmatrix} D_\alpha SC_p & C_\alpha \\ 0 & 0 \end{bmatrix}, C_2 = [D_\alpha SC_p \quad C_\alpha] \quad (39)$$

The parameters $D_{11}$, $D_{12}$, $D_{21}$, and $D_{22}$ can be represented in the following expression.

$$D_{11} = \begin{bmatrix} -D_\alpha S & D_\alpha SD_{p1}M \\ 0 & 0 \end{bmatrix}, D_{12} = \begin{bmatrix} D_\alpha SD_{p2}T \\ I \end{bmatrix} \quad (40)$$

$$D_{21} = [-D_\alpha S \quad D_\alpha SD_{p1}M], D_{22} = D_\alpha SD_{p2}T$$

Figure 13:
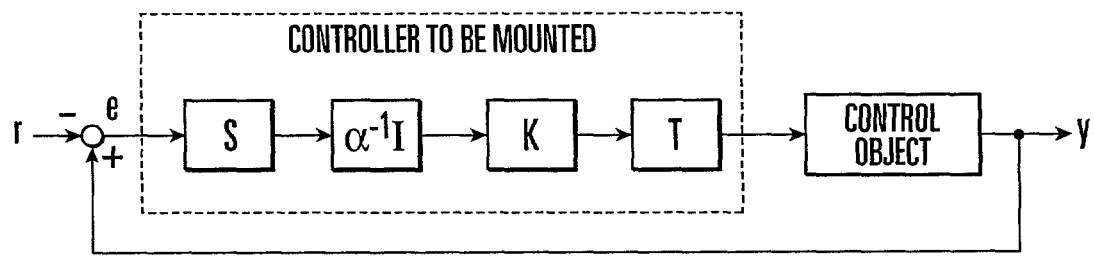
FIG. 13 is a block diagram showing the configuration of an actual controller containing the controller designed using the design device in the third embodiment of the invention.

The sensitivity weight $W_s$ and the complementary sensitivity weight $W_t$ are designed in the same manner as in the first embodiment, and multiplied by the output part of the expression (11), and through γ iteration, the controller K is obtained in the state space representation. The actual controller mounted in the plants such as distillation tower is the controller K multiplied by the weight matrix S, the weight $\alpha^{-1}I$ and the scaling matrix T, as shown in FIG. 13.

Referring now to FIG. 11, the above operation will be described below. The operation of the control object model input unit 1, the control object model registration unit 2, the frequency response calculation unit 4 and the scaling matrix calculation unit 5 is exactly the same as in the first or second embodiment. A memory unit 3a stores the formulae of the generalized plant of FIG. 12 and the formulae of the control object model that is part of the generalized plant, as described in the expressions (1) to (5), (11), and (32) to (40). The control variable weight $W_{yL}$ for the L-th controlled variable $y_L$ is set in the control variable weight input unit 7 by the user of the design device. This control variable weight $W_{yL}$ is set for each controlled variable y. The control variable weight registration unit 8 outputs the control variable weight $W_{yL}$ input from the control variable weight input unit 7 to the weight matrix calculation unit 9. The weight matrix calculation unit 9 calculates the weight matrix S, based on the control variable weight $W_{yL}$, employing the expressions (29) and (30), and outputs it to a controller calculation unit 6a. The controller calculation unit 6a registers the scaling matrix T and the weight matrix S in the formulae of the generalized plant stored in the memory unit 3a, and through γ iteration, calculates the parameters of the controller K. At this time, the complementary sensitivity weight $W_t$, the sensitivity weight $W_s$ and the scaling matrix M are preset in the generalized plant in the memory unit 3a. In this way, the controller K can be designed.

As described above, in this third embodiment, each controlled variable y can be directly weighted by introducing the weight matrix S. Thereby, the controller with higher control performance and enhanced stability can be designed. Also, there is no need of providing the scaling matrix T with a role of weighting the controlled variable y by introducing the weight matrix S.

FOURTH EMBODIMENT

Figure 14:
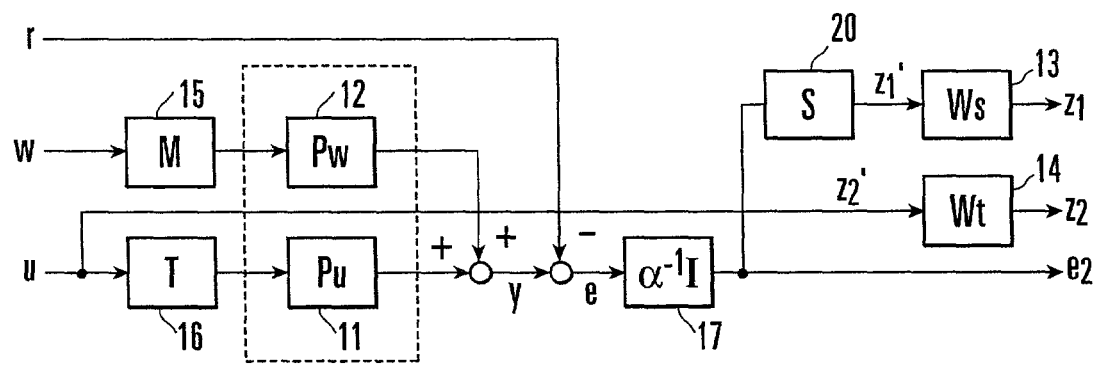
FIG. 14 is a block diagram showing the configuration of the generalized plants in a fourth embodiment of the present invention.

In the third embodiment, the control variable weight adjusting means 20 (weight matrix S) is provided inside the closed loop system, but may be provided outside the closed loop system. FIG. 14 is a block diagram showing the configuration of the generalized plant in a fourth embodiment of the present invention. In this fourth embodiment, the control variable weight adjusting means 20 (weight matrix S) is provided at the former stage of the frequency sensitivity weight adjusting means 13. A method for determining the weight matrix S is exactly the same as the method for determining in the third embodiment as described in the expressions (29) and (30).

Next, in this fourth embodiment, the configuration of the generalized plant is modified as shown in FIG. 14, so that the expression (4) can be rewritten into the following expression.

$$z_1' = Se_2 \quad (41)$$

Thereby, the expression (9) can be rewritten in the following expression.

$$\begin{bmatrix} z_1' \\ z_2' \end{bmatrix} = \begin{bmatrix} SD_\alpha C_p & SC_\alpha \\ 0 & 0 \end{bmatrix} \begin{bmatrix} x_p \\ x_\alpha \end{bmatrix} + \begin{bmatrix} -SD_\alpha & SD_\alpha D_{p1}M & SD_\alpha D_{p2}T \\ 0 & 0 & I \end{bmatrix} \begin{bmatrix} r \\ w \\ u \end{bmatrix} \quad (42)$$

Representing the expressions (8), (10) and (42) in the Doile's notation as in the expression (11), the parameters $C_1$ and $C_2$ in the expression (11) can be represented in the following expression.

$$C_1 = \begin{bmatrix} SD_\alpha C_p & SC_\alpha \\ 0 & 0 \end{bmatrix}, C_2 = \lfloor D_\alpha C_p \quad C_\alpha \rfloor \quad (43)$$

Also, the parameters $D_{11}$, $D_{12}$, $D_{21}$ and $D_{22}$ can be represented in the following expression.

$$D_{11} = \begin{bmatrix} -SD_\alpha & SD_\alpha D_{p1}M \\ 0 & 0 \end{bmatrix}, D_{12} = \begin{bmatrix} SD_\alpha D_{p2}T \\ I \end{bmatrix} \quad (44)$$

$$D_{21} = \lfloor -D_\alpha \quad D_\alpha D_{p1}M \rfloor, D_{22} = D_\alpha D_{p2}T$$

The parameters A, $B_1$ and $B_2$ are the same as shown in the expressions (12) and (13). In this fourth embodiment, the actual controller mounted in the plants such as distillation tower is the controller K multiplied by the weight $\alpha^{-1}$ and the scaling matrix T, as shown in FIG. 6.

In this fourth embodiment, the configuration of the design device is almost the same as in the third embodiment. Thus, the operation of the design device of this fourth embodiment will be described below with reference to FIG. 11.

The operation of the control object model input unit 1, the control object model registration unit 2, the frequency response calculation unit 4 and the scaling matrix calculation unit 5 is exactly the same as in the first or second embodiment. A memory unit 3a stores the formulae of the generalized plant of FIG. 14 and the formulae of the control object model that is part of the generalized plant, as described in the expressions (1) to (3), (5) to (8), (10) to (13), and (41) to (44). The operation of the control variable weight input unit 7, the control variable weight registration unit 8 and the weight matrix calculation unit 9 is exactly the same as in the third embodiment. The controller calculation unit 6a registers the scaling matrix T and the weight matrix S in the formulae of the generalized plant stored in the memory unit 3a, and through γ iteration, calculates the parameters of the controller K. In this way, the controller K can be designed.

In this fourth embodiment, the control variable weight adjusting means 20 (weight matrix S) is provided at the former stage of the frequency sensitivity weight adjusting means 13, but may be provided at the latter stage of the frequency sensitivity weight adjusting means 13. Since the magnitudes of the gains of the control object model 11 are made consistent by the scaling matrix T, the weight matrix S can be easily adjusted, and it is prerequisite that the method for determining the scaling matrix T as described in the first or second embodiment is employed in the third or fourth embodiment.

FIFTH EMBODIMENT

Figure 15:
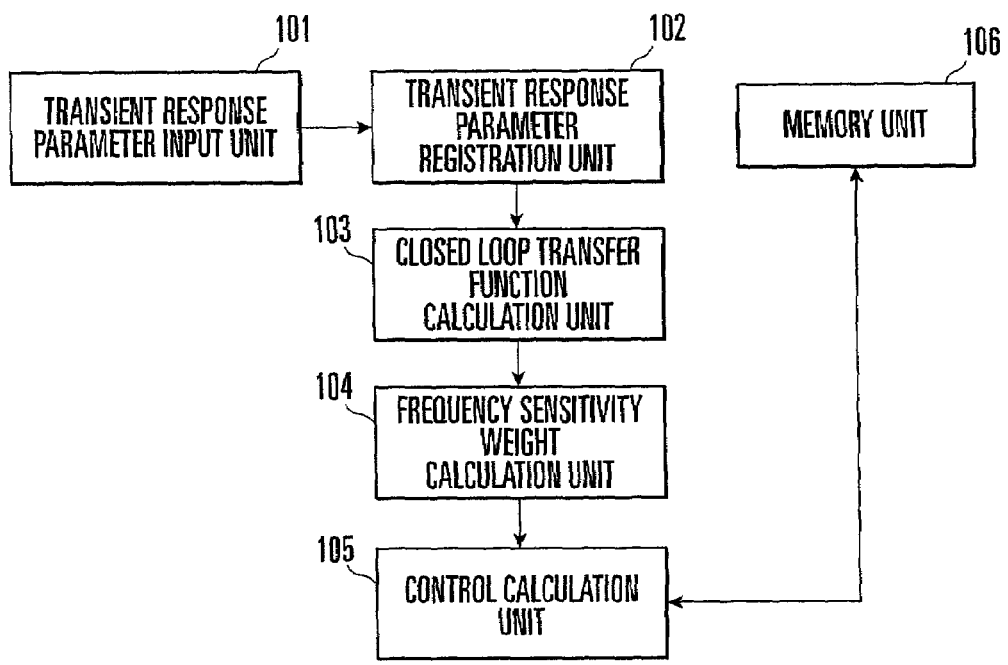
FIG. 15 is a block diagram showing the configuration of a design device of a controller in a fifth embodiment of the present invention.

FIG. 15 is a block diagram showing the configuration of a design device of a controller in a fifth embodiment of the present invention. The design device of FIG. 15 comprises a transient response parameter input unit 101 for inputting the transient response parameters indicating the transient response characteristics of a closed loop system composed of the control objects and the controller, a transient response parameter registration unit 102 for registering the transient response parameters within the device, a closed loop transfer function calculation unit 103 for calculating the transient response characteristics of the closed loop system based on the transient response parameters input from the transient response parameter registration unit 102, a frequency sensitivity weight calculation unit 104 for calculating the frequency sensitivity weight for determining the set value followup characteristic of the closed loop system, based on the transient response characteristics of the closed loop system, and a controller calculation unit 105 for calculating the parameters of the controller by applying the frequency sensitivity weight to the preset generalized plants. The transient response parameter input unit 101, the transient response parameter registration unit 102 and the closed loop transfer function calculation unit 103 constitute setting means for setting the transient response characteristics of the closed loop system.

Figure 16:
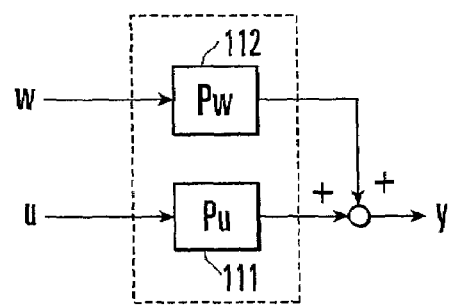
FIG. 16 is a block diagram showing the configuration of a model of an actual control object as represented in the formulae.

An algorithm for designing the controller in accordance with the H ∞ logic is designed based on the generalized plants as represented using the control objects. Therefore, the generalized plants will be first described. FIG. 16 is a block diagram showing the configuration of a model of an actual control object as represented in the formulae. A numerical model of the control object as shown in FIG. 16 is composed of a model 111 for the manipulated variable u and a model 112 for the disturbance w. Reference sign Pu denotes a transfer function of the model 111 and reference sign Pw denotes a transfer function of the model 112. The models 111, 112 are obtained as a result of the model identification using the data obtained by a step response test for the actual control object. The controlled variable y that is the output of control object is a sum of the outputs from the models 111 and 112.

Figure 17:
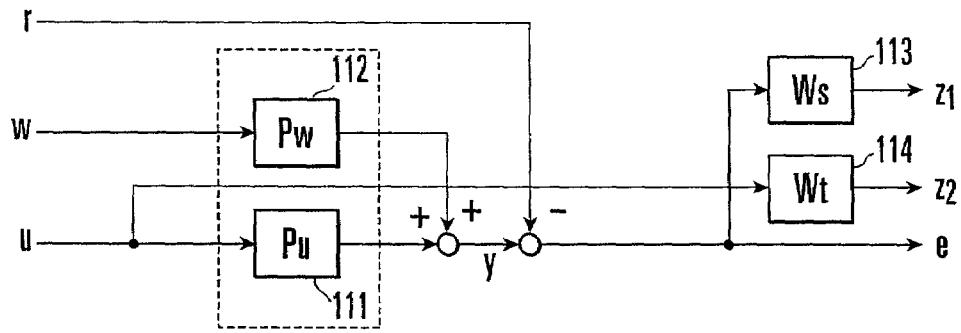
FIG. 17 is a block diagram showing the configuration of the conventional generalized plants.

FIG. 17 shows the configuration of the conventional generalized plants containing such numerical model of control object. The generalized plants involve providing a frequency weight called a sensitivity weight $W_s$ used to determine the set value followup characteristic and a frequency weight called a complementary sensitivity weight $W_t$ used to determine the robust stability, and introducing the set value r, and the outputs z1, z2 in addition to the input (manipulated variable) u of control object, input (disturbance) w, and output (controlled variable) y, to realize both the set value followup characteristic and the robust stability as shown in FIG. 17. Deviation e (=y−r) is an observation quantity or the input into the controller (not shown). Reference numeral 113 denotes a block representing the sensitivity weight $W_s$, and reference sign $Z_1$ denotes an output for effecting the evaluation of the set value followup characteristic. Also, reference numeral 114 denotes a block representing the complementary sensitivity weight $W_t$, and reference sign $Z_2$ denotes an output for effecting the evaluation of the robust stability.

Conventionally, in the generalized plants as shown in FIG. 17, the complementary sensitivity weight $W_t$ is determined by estimating the uncertainty of the models on the basis of the numerical models of control objects, the sensitivity weight $W_s$ is determined by directly specifying the frequency characteristic in view of the followup ability to the set value r, whereby the parameters of the controller are determined through the γ iteration. However, since employing the generalized plants of FIG. 17, the controller is designed on the basis of a larger gain due to differences in the gains for the plant outputs of the manipulated variables, the obtained controller is likely to be very conservative, or excessively stable. Also, since the set value followup characteristic and the disturbance response characteristic are usually reciprocal, it is preferred to design with the weight according to the purpose rather than with the same weight. Further, in the generalized plants of FIG. 17 containing no integral element, some steady-state deviation arises. If the sensitivity weight $W_s$ is provided with the integral characteristic, the controller can have the integral characteristic, but the generalized plants become unstable, not leading to the normal H ∞ problem.

Figure 18:
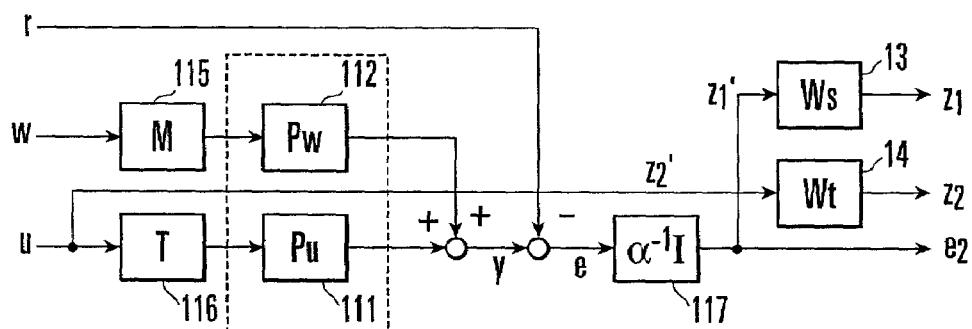
FIG. 18 is a block diagram showing the configuration of the generalized plants for use with the design device of the invention.
Figure 19:
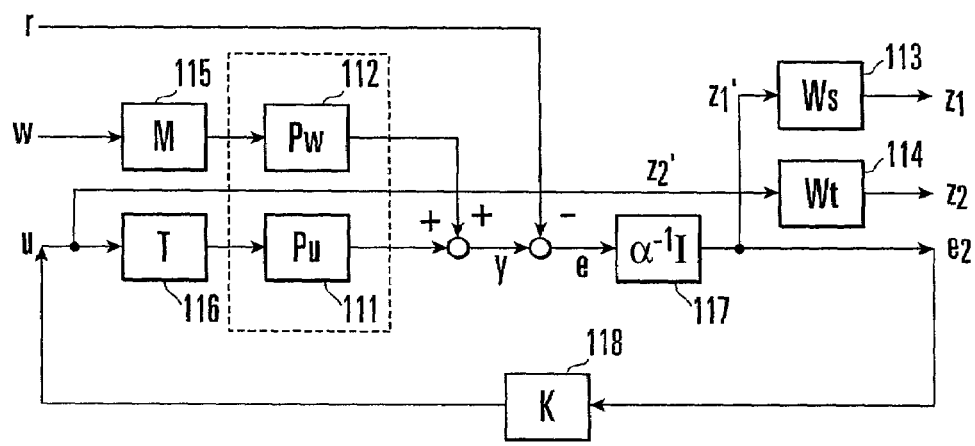
FIG. 19 is a block diagram showing the configuration of a robust control system with a controller added to the generalized plants of FIG. 18.

Therefore, in this fifth embodiment, the generalized plant as shown in FIG. 18 is considered. In FIG. 18, reference sign M denotes a scaling matrix for adjusting the influence of disturbance w on the controlled variable y, reference sign T denotes a scaling matrix for making the magnitudes of errors of the control objects consistent, and reference sign $\alpha^{-1}I$ denotes a weight for providing the controller with the integral characteristic to eliminate the steady-state deviation. Herein, α(s) is defined as α(s)=s/(s+a). Where s is a Laplace operator, and a (>0) is any real number. Reference numeral 115 denotes a block representing the scaling matrix M, reference numeral 116 denotes a block representing the scaling matrix T, and reference numeral 117 denotes a block representing the weight $\alpha^{-1}I$. Deviation $e_2$ is deviation e multiplied by the weight $\alpha^{-1}I$, and input into the controller. FIG. 19 shows the configuration of a robust control system in which a controller K is added to the above generalized plant. In FIG. 19, reference numeral 118 denotes a block representing the controller K.

The design device of the controller in this fifth embodiment is aimed at determining the parameters of the controller K such that the controlled variable y that is the output of control object follows the set value r, the influence of disturbance w is removed, and the control object is stabilized even if it is fluctuated or there is an error in the model of control object. The H ∞ control problem can be regarded as the problem of reducing the H ∞ norm (gain) of the transfer function from (r, w) to ($z_1$, $z_2$). That is, the set value followup characteristic, the robust stability and the disturbance suppression may be considered in the following way.

(D) Set value followup characteristic: If the H ∞ norm (gain) of the transfer function from the set value r to deviation e (more correctly, transfer function with the set value r multiplied by the frequency weight $\alpha^{-1}W_s$ from r to $z_1$) is reduced, the deviation e can be decreased, so that the set value followup characteristic can be made better. Herein, $\alpha^{-1}W_s$ is the frequency weight for restricting the followup band (e.g., followup only in the low band).

(E) Robust stability: There is an error between the actual control object and its model due to characteristic variations of the control object or the error at the time of modeling. The maximum value of the error from the identified model is estimated as $\Delta(s)$, and the controller K is designed such that the H ∞ norm from the set value r to $z_2$ is smaller than or equal to 1, employing the complementary sensitivity weight $W_t$ (s) such that $|\Delta(j\omega)|<|W_t(j\omega)|$ for this error, whereby the robust stabilization can be achieved.

(F) Disturbance suppression: If the H ∞ norm (gain) of the transfer function from disturbance w to deviation e (more correctly, transfer function with the disturbance w multiplied by the frequency weight $\alpha^{-1}W_s$ from w to $z_1$) is reduced, the deviation e can be decreased even if the disturbance w enters, whereby the disturbance suppression can be ameliorated.

Next, it is supposed that the state space representation of the generalized plant as shown in FIG. 18 is given by:

$$\dot{x} = A_p x_p + B_{p1} Mw + B_{p2} Tu \quad (101)$$

$$y = C_p x_p + D_{p1} Mw + D_{p2} Tu \quad (102)$$

In the above expressions (101) and (102), $x_p$ is the quantity of state, and $A_p$, $B_{p1}$, $B_{p2}$, $C_p$, $D_{p1}$ and $D_{p2}$ are the parameters of the numerical models 111, 112 of control objects. From the expression (102), the deviation e can be obtained in the following expression.

$$e = y - r = C_p x_p + D_{p1} Mw + D_{p2} Tu - r \quad (103)$$

With the configuration of the generalized plant as shown in FIG. 18, the outputs $z_1'$ and $z_2'$ can be defined in the following expressions.

$$z_1' = e_2 \quad (104)$$

$$z_2' = u \quad (105)$$

The frequency weight for providing the controller K with the integral characteristic can be defined in the following expression, using the expression (103).

$$\dot{x}_\alpha = A_\alpha x_\alpha + B_\alpha e \quad (106)$$
$$= A_\alpha x_\alpha + B_\alpha C_p x_p + B_\alpha D_{p1} Mw + B_\alpha D_{p2} Tu - B_\alpha r$$

$$e_2 = C_\alpha x_\alpha + D_\alpha e \quad (107)$$
$$= C_\alpha x_\alpha + D_\alpha C_p x_p + D_\alpha D_{p1} Mw + D_\alpha D_{p2} Tu - D_\alpha r$$

In the expressions (106) and (107), $x_\alpha$ is the quantity of state of $\alpha^{-1}I$, and $A_\alpha$, $B_\alpha$, $C_\alpha$ and $D_\alpha$ are the parameters of $\alpha^{-1}I$. Arranging the above expressions and representing them in a state space, the following three expressions can be obtained.

$$\frac{d}{dt}\begin{bmatrix} x_p \\ x_\alpha \end{bmatrix} = \begin{bmatrix} A_p & 0 \\ B_\alpha C_p & A_\alpha \end{bmatrix} \begin{bmatrix} x_p \\ x_\alpha \end{bmatrix} + \begin{bmatrix} 0 & B_{p1}M & B_{p2}T \\ -B_\alpha & B_\alpha D_{p1}M & B_\alpha D_{p2}T \end{bmatrix} \begin{bmatrix} r \\ w \\ u \end{bmatrix} \quad (108)$$

$$\begin{bmatrix} z_1' \\ z_2' \end{bmatrix} = \begin{bmatrix} D_\alpha C_p & C_\alpha \\ 0 & 0 \end{bmatrix} \begin{bmatrix} x_p \\ x_\alpha \end{bmatrix} + \begin{bmatrix} -D_\alpha & D_\alpha D_{p1}M & D_\alpha D_{p2}T \\ 0 & 0 & I \end{bmatrix} \begin{bmatrix} r \\ w \\ u \end{bmatrix} \quad (109)$$

$$e_2 = \quad (110)$$
$$[D_\alpha C_p \quad C_\alpha] \begin{bmatrix} x_p \\ x_\alpha \end{bmatrix} + [-D_\alpha \quad D_\alpha D_{p1}M \quad D_\alpha D_{p2}T] \begin{bmatrix} r \\ w \\ u \end{bmatrix}$$

Representing the expressions (108), (109) and (110) in Doile's notation, the following expression can be obtained.

$$G(s) = \begin{bmatrix} A & B_1 & B_2 \\ C_1 & D_{11} & D_{12} \\ C_2 & D_{21} & D_{22} \end{bmatrix} \quad (111)$$

Parameter A can be represented as follows:

$$A = \begin{bmatrix} A_p & 0 \\ B_\alpha C_p & A_\alpha \end{bmatrix} \quad (112)$$

Parameters $B_1$ and $B_2$ can be represented as follows:

$$B_1 = \begin{bmatrix} 0 & B_{p1}M \\ -B_\alpha & B_\alpha D_{p1}M \end{bmatrix}, B_2 = \begin{bmatrix} B_{p2}T \\ B_\alpha D_{p2}T \end{bmatrix} \quad (113)$$

Also, parameters $C_1$ and $C_2$ can be represented as follows:

$$C_1 = \begin{bmatrix} D_\alpha C_p & C_\alpha \\ 0 & 0 \end{bmatrix}, C_2 = \lfloor D_\alpha C_p \quad C_\alpha \rfloor \quad (114)$$

And the parameters $D_{11}$, $D_{12}$, $D_{21}$, $D_{22}$ can be represented as follows:

$$D_{11} = \begin{bmatrix} -D_\alpha & D_\alpha D_{p1}M \\ 0 & 0 \end{bmatrix}, D_{12} = \begin{bmatrix} D_\alpha D_{p2}T \\ I \end{bmatrix} \quad (115)$$
$$D_{21} = \lfloor -D_\alpha \quad D_\alpha D_{p1}M \rfloor, D_{22} = D_\alpha D_{p2}T$$

The sensitivity weight $W_s$ and the complementary sensitivity weight $W_t$ are designed, and multiplied by the output parts of the expression (111). Through γ iteration, the controller K is obtained in the state space representation. Herein, the output parts of the expression (111) signify the parts corresponding to the outputs $z_1'$, $z_2'$ in FIG. 18. Hence, an output equation of the parameters $C_1$, $D_{11}$, $D_{12}$ of the expression (111) may be multiplied by a diagonal matrix Q as represented in the following expression having the diagonal elements of sensitivity weight $W_s$ and complementary sensitivity weight $W_t$ from the left side. Thus, the parameters of the controller K can be calculated.

$$Q = \begin{bmatrix} W_s & 0 \\ 0 & W_t \end{bmatrix} \quad (116)$$

Figure 20:
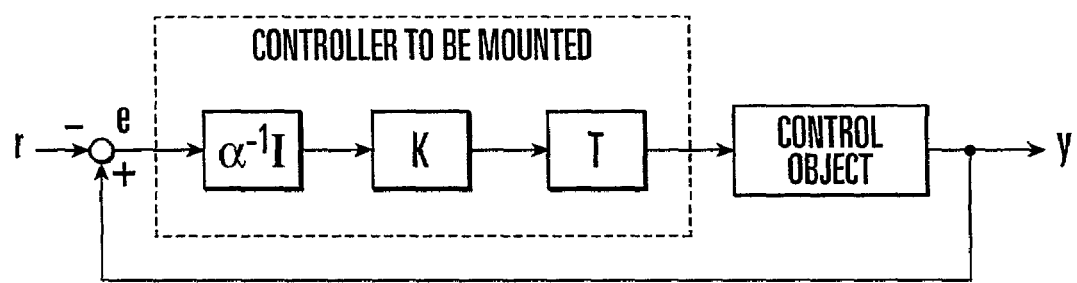
FIG. 20 is a block diagram showing the configuration of an actual controller containing the controller designed using the design device of the invention.

The controller K is a solution of the H ∞ control problem with the generalized plants, and the actual controller mounted on the plants such as a distillation tower is the controller K multiplied by weight $\alpha^{-1}I$ and scaling matrix T, as shown in FIG. 20.

Figure 21:
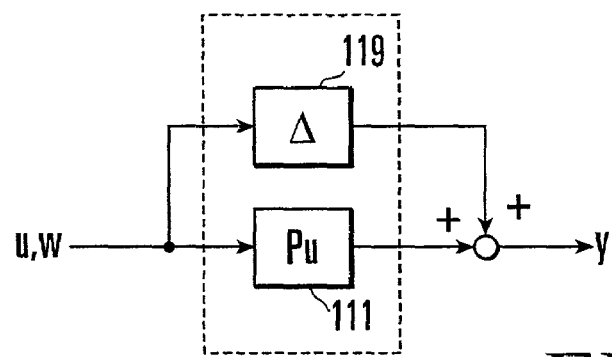
FIG. 21 is a block showing an additive error in a numerical model of the control object.

As previously described, the H ∞ logic is a design method in the frequency domain. Therefore, the design is easy in the control of the mechanical system, but is hard in the control system untreatable in the frequency domain such as the process control, and it is difficult to suitably select the complementary sensitivity weight $W_t$ and the sensitivity weight $W_s$. In the following, a method for determining the complementary sensitivity weight $W_t$ in this embodiment will be described below. The control object is varied in the characteristics, depending on the driving conditions. Normally, the control design is made based on a certain model, but in the robust control design, the variation of control object and the magnitude of error of modeling are contained beforehand in the control design, and the controller is designed to be stable without much deterioration in the control performance even if there is any variation or error. FIG. 21 shows an additive error for the model 111 of control object. In FIG. 21, reference numeral 119 denotes a block representing the additive error Δ. In the robust control design, a variation in the characteristic of the control object owing to the driving conditions and a model error due to lower dimension of the model 111 are represented as the additive error Δ as shown in FIG. 21. If the characteristics of the control object are deviated from the model 111 due to this additive error Δ, the controller is designed such that the controller output may be stable. To this end, the complementary sensitivity weight $W_t$ may be determined to cover the additive error Δ. The general expression of this complementary sensitivity weight $W_t$ is shown in the following expression. Since the change of the model 112 is not related with the stability of the system, it is supposed that the model 111 alone is varied in designing the controller.

$$W_t = \begin{bmatrix} W_{t1} & 0 & 0 & \cdots & 0 \\ 0 & W_{t2} & 0 & \cdots & 0 \\ 0 & 0 & W_{t3} & \cdots & 0 \\ \vdots & \vdots & \vdots & \ddots & \vdots \\ 0 & 0 & 0 & \cdots & W_{tN} \end{bmatrix} \quad (117)$$

In this fifth embodiment, for the additive error Δ with scaled magnitude, employing the scaling matrix T, the element of the complementary sensitivity weight $W_t$ is the maximum value Gmax of the gains of error Δ multiplied by a safety factor δ(δ is equal to 1, for example). Namely, the elements (weights) $W_{t1}$, $W_{t2}$, $W_{t3}$, ..., $W_{tN}$ are defined as follows:

$$W_{t1} = W_{t2} = W_{t3} = W_{tN} = (1+\delta)G \max \quad (118)$$

This embodiment is involved with the multivariable control system, and assuming that the number of manipulated variables u is N (N is a positive integer), the complementary sensitivity weight $W_t$ is N×N matrix. Where $W_{tN}$ is the weight for the N-th manipulated variable $u_N$.

Next, the methods for determining the scaling matrices T, M will be described below. A general expression of the scaling matrix T is shown in the following expression.

$$T = \begin{bmatrix} T_1 & 0 & 0 & \cdots & 0 \\ 0 & T_2 & 0 & \cdots & 0 \\ 0 & 0 & T_3 & \cdots & 0 \\ \vdots & \vdots & \vdots & \ddots & \vdots \\ 0 & 0 & 0 & \cdots & T_N \end{bmatrix} \quad (119)$$

Assuming that the number of manipulated variables u is N, the scaling matrix T is N×N matrix. Element $T_N$ of the scaling matrix T is the weight for the N-th manipulated variable $u_N$. Each element $T_N$ is determined such that the magnitudes of the components of the additive error Δ are as equal as possible.

Next, a general expression of the scaling matrix M is shown in the following expression.

$$M = \begin{bmatrix} M_1 & 0 & 0 & \cdots & 0 \\ 0 & M_2 & 0 & \cdots & 0 \\ 0 & 0 & M_3 & \cdots & 0 \\ \vdots & \vdots & \vdots & \ddots & \vdots \\ 0 & 0 & 0 & \cdots & M_J \end{bmatrix} \quad (120)$$

Assuming that the number of disturbance w is J (J is a positive integer), the scaling matrix M is J×J matrix. Element $M_J$ of the scaling matrix M is the weight for the J-th disturbance $w_J$. Each element $M_J$ is an adjustment parameter for determining the disturbance suppression performance by adjusting the influence of each disturbance $w_J$ on the controlled variable y.

Next, a method for determining the sensitivity weight $W_s$ in this fifth embodiment will be described below. First of all, a general expression of the sensitivity weight $W_s$ is shown in the following expression.

$$W_s = \begin{bmatrix} W_{s1} & 0 & 0 & \cdots & 0 \\ 0 & W_{s2} & 0 & \cdots & 0 \\ 0 & 0 & W_{s3} & \cdots & 0 \\ \vdots & \vdots & \vdots & \ddots & \vdots \\ 0 & 0 & 0 & \cdots & W_{sL} \end{bmatrix} \quad (121)$$

Figure 22:
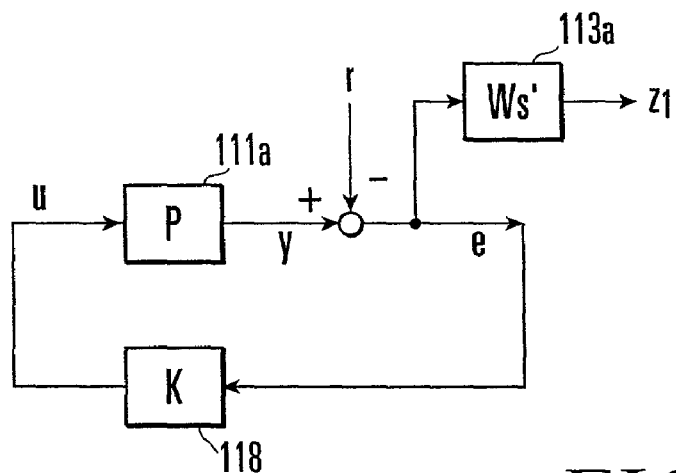
FIG. 22 is a block diagram showing the configuration of a closed loop system used in determining the sensitivity weight.

Assuming that the number of controlled variables y is L (L is a positive integer), the sensitivity weight $W_s$ is L×L matrix. Element $W_{sL}$ of the sensitivity weight $W_s$ is the weight for the L-th controlled variable $y_L$. In order to determine the sensitivity weight $W_s$, a closed loop system of FIG. 22 in which the robust control system of FIG. 19 is simplified is considered. In FIG. 22, reference numeral 111a denotes a block representing a numerical model P of control object, and reference numeral 113a denotes a block representing the frequency weight $W_s'$.

Supposing that the sensitivity function indicating the control performance mainly regarding the quick-response property such as the set value followup ability or disturbance suppression is S(s), the smaller gain |S(jω)| of the sensitivity function S(s) is preferable because the model variations have less effect on the set value response. If the control specification at each frequency is given by $S_{spec}(\omega)$, the following condition concerning the sensitivity function S(s) can be obtained.

$$|S(j\omega)| < S_{spec}(\omega); \forall \omega \quad (122)$$

Where ∀ω means that the expression (122) holds for all frequencies ω.

On one hand, the sensitivity function S(s) corresponds to the transfer function $G_{er}(s)$ of the closed loop system from the set value r to deviation e, as shown in FIG. 22. Supposing that the transfer function of control object is P(s) and the transfer function of controller is K(s), the following expression is obtained.

$$S(s) = G_{er}(s) = \frac{-1}{1 - P(s)K(s)} \quad (123)$$

Also, the transfer function $G_{yr}(s)$ of the closed loop system of FIG. 22 from the set value r to the controlled variable y is obtained in the following expression.

$$G_{yr}(s) = \frac{-P(s)K(s)}{1 - P(s)K(s)} \quad (124)$$

From the expressions (123) and (124), the sensitivity function S(s) can be obtained in the following expression.

$$S(s) = G_{yr}(s) - 1 \quad (125)$$

In this fifth embodiment, the transient response characteristic of the closed loop system as shown in FIG. 22, or the transfer function $G_{yr}(s)$ of the closed loop system from the set value r to the controlled variable y is approximated with a first-order lag characteristic as in the following expression, giving $G_{yr\_spec}(s)$ as the specification of the transfer function $G_{yr}(s)$ $$G_{yr\_spec}(s) = \frac{1}{T_{sL}s + 1} \quad (126)$$

In the expression (126), $T_{sL}$ is a time constant regarding the L-th controlled variable $y_L$. Employing $G_{yr\_spec}(s)$ in the expression (126), instead of $G_{yr}(s)$ in the expression (125), the following control specification $S_{spec}(s)$ is obtained.

$$S_{spec}(s) = -\frac{T_{sL}s}{T_{sL}s + 1} \quad (127)$$

In this fifth embodiment, the frequency weight $W_{sL}'(s)$ regarding the L-th controlled variable $y_L$ is set as follows:

$$W_{sL}'(s) = \frac{1}{S_{spec}(s)} = -\frac{T_{sL}s + 1}{T_{sL}s} \quad (128)$$

The frequency weight $W_{sL}'(s)$ is $W_{sL}(s)$ multiplied by $\alpha^{-1}(s)$, and defined as follows:

$$W_{sL}'(s) = \alpha^{-1}(s) W_{sL}(s) \quad (129)$$

If the frequency weight $W_{sL}'(s)$ is set as in the expression (128), the expression (122) can be transformed into the following expression.

$$|S(j\omega)| < \frac{1}{|W'_{sL}(j\omega)|}; \forall \omega \quad (130)$$

Further, the expression (130) can be rewritten into the following expression, using the H ∞ norm.

$$\|W_{sL}'(s)S(s)\|_\infty < 1 \quad (131)$$

The expression (131) indicates that the H ∞ norm of the transfer function of the closed loop system of FIG. 22 from the set value r to the deviation e (more correctly, the transfer function with the set value r multiplied by the frequency weight $\alpha^{-1}(s)W_{sL}(s)$ from r to $z_1$) is less than 1. This expression (131) is a design index of the controller K in view of the set value followup characteristic. Accordingly, by setting the frequency weight $W_{sL}'(s)$ in accordance with the expression (128), the expression (131) is satisfied, whereby the controller K can be designed in view of the set value followup characteristic. If the expression (128) is transformed, the following expression is obtained.

$$W'_{sL}(s) = \frac{s+a}{s} \cdot \frac{-(T_{sL}s + 1)}{T_{sL}(s + a)} \quad (132)$$

The first term on the right side of the expression (132) is $\alpha^{-1}(s)$. Therefore, element $W_{sL}(s)$ of the sensitivity weight $W_s$ can be calculated as follows:

$$W_{sL}(s) = -\frac{T_{sL}s + 1}{T_{sL}(s + a)} \quad (133)$$

Substituting the expression (133), the expression (121) can be represented as follows:

$$W_s = \begin{bmatrix} -\frac{T_{s1}s+1}{T_{s1}(s+a)} & 0 & 0 & \cdots & 0 \\ 0 & -\frac{T_{s2}s+1}{T_{s2}(s+a)} & 0 & \cdots & 0 \\ 0 & 0 & -\frac{T_{s3}s+1}{T_{s3}(s+a)} & \cdots & 0 \\ \vdots & \vdots & \vdots & \ddots & \vdots \\ 0 & 0 & 0 & \cdots & -\frac{T_{sL}s+1}{T_{sL}(s+a)} \end{bmatrix} \quad (134)$$

In this way, the sensitivity weight $W_s$ can be determined. Referring now to FIG. 15, the above operation will be described below. The transient response parameter or the time constant $T_{sL}$ is set in the transient response parameter input unit 101 by the user of the design device. The time constant $T_{sL}$ is set for each controlled variable y. The transient response parameter registration unit 102 outputs the time constant $T_{sL}$ input from the transient response parameter input unit 101 directly to the closed loop transfer function calculation unit 103. The closed loop transfer function calculation unit 103 calculates the transfer function $G_{yr}(s)$ of the closed loop system as shown in FIG. 22 from the set value r to the controlled variable y by substituting the input time constant $T_{sL}$ into the expression (126), and outputs it to the frequency sensitivity weight calculation unit 104. Subsequently, the frequency sensitivity weight calculation unit 104 calculates the sensitivity weight $W_s$, based on the transfer function $G_{yr}(s)$, employing the expressions (125), (127), (128), and (132) to (134), and outputs it to the controller calculation unit 105. The memory unit 106 stores the formulae of generalized plants as described in the expressions (101) to (115) and shown in FIG. 18. The controller calculation unit 105 registers the sensitivity weight $W_s$ in the formulae of the generalized plants stored in the memory unit 106, and through γ iteration, calculates the parameters of the controller K. At this time, the complementary sensitivity weight $W_t$, and the scaling matrices T, M are preset in the generalized plants in the memory unit 106. In this way, the controller K can be designed.

As previously described, in the process control field, it is difficult to give the control specification in the frequency domain, and to determine the frequency sensitivity weight $W_s$. On the contrary, in this embodiment, the transient response characteristic (transfer function $G_{yr}(s)$) of the closed loop system is set, and the frequency weight $W_s$ can be calculated, based on this transient response characteristic. Thereby, even in the process control field, where the frequency response characteristic is difficult to give as the control specification, the controller can be designed in accordance with the H∞ logic. Consequently, the multivariable control system can be easily designed in view of the variations of the control objects and the uncertainty of the numerical models. Also, the controller can be realized utilizing the features of the H∞ logic with smaller computational load during execution of the control, and with which the small-scale control system can be implemented. By approximating the transient response characteristic of the closed loop system with a first-order lag characteristic, the parameters for the control design are intuitively understandable to the designer. Therefore, the design device that is easily understood and used by the designer can be realized. Since the parameters are intuitively understandable to the designer, the design device that is capable of changing the design can be realized in the case where the controller is redesigned after designed once.

SIXTH EMBODIMENT

In the fifth embodiment, the transient response characteristic of the closed loop system is approximated with a first-order lag, and the sensitivity weight $W_s$ is determined by specifying the time constant of the closed loop system for the controlled variables. In this case, albeit the control design based on the transient response characteristic, only one design parameter is specified for each controlled variable, and the obtained control system does not necessarily operate with the first-order lag as specified. Considering the practicality of the multivariable control, it is not favorable to increase the number of design parameters, but if the degree of freedom for the design is increased by making the meanings of design parameters clear, it may not be necessarily a false policy. Thus, in this sixth embodiment, the controller is designed by approximating the characteristics of the closed loop system with a second-order system as commonly used, and specifying the transient response characteristic parameters.

Firstly, the transient response of the closed loop system of FIG. 22 for each controlled variable is approximated with the second-order system in the following expression.

$$\frac{y}{r} = \frac{\omega_n^2}{s^2 + 2\zeta\omega_n s + \omega_n^2} \quad (135)$$

In the expression (135), $\zeta(\zeta>0)$ is a damping coefficient, and $\omega_n$ ($\zeta>0$) is a natural frequency. The solution of the characteristic equation of the system as indicated in the expression (135) is obtained in the following expression.

$$s = -\zeta\omega_n \pm \omega_n\sqrt{\zeta^2 - 1} \quad (136)$$

Giving a step input (r (s)=1/s), the controlled variable y(s) that is an output of the closed loop system can be obtained in the following expression.

$$y(s) = \frac{\omega_n^2}{(s-s_1)(s-s_2)} \cdot \frac{1}{s} \quad (137)$$
$$= \frac{1}{s} + \frac{C_1}{s + \zeta\omega_n - \omega_n\sqrt{\zeta^2 - 1}} + \frac{C_2}{s + \zeta\omega_n + \omega_n\sqrt{\zeta^2 - 1}}$$

The parameters $s_1$, $s_2$, $C_1$, $C_2$ in the expression (137) are given in the following expression.

$$s_1 = -\zeta\omega_n + \omega_n\sqrt{\zeta^2 - 1}, s_2 = -\zeta\omega_n - \omega_n\sqrt{\zeta^2 - 1} \quad (138)$$
$$C_1 = \frac{-\zeta - \sqrt{\zeta^2 - 1}}{2\sqrt{\zeta^2 - 1}}, C_2 = \frac{\zeta - \sqrt{\zeta^2 - 1}}{2\sqrt{\zeta^2 - 1}}$$

Consider the most important damped oscillation (0<ζ<1) in the second-order system characteristic. Then, the parameters $C_1$, $C_2$ are given in the following expression.

$$C_1 = \frac{i(\zeta + i\sqrt{1-\zeta^2})}{2\sqrt{1-\zeta^2}}, C_2 = \frac{i(-\zeta + i\sqrt{1-\zeta^2})}{2\sqrt{1-\zeta^2}} \quad (139)$$

Thereby, the time response of the closed loop system as shown in FIG. 22 can be represented in the following expression.

$$y(t) = 1 + \frac{i(\zeta + i\sqrt{1-\zeta^2})}{2\sqrt{1-\zeta^2}} \cdot \exp(-\zeta\omega_n + i\omega_n\sqrt{1-\zeta^2})t + \quad (140)$$

-continued $$\frac{i(-\zeta + i\sqrt{1-\zeta^2})}{2\sqrt{1-\zeta^2}} \cdot \exp(-\zeta\omega_n - i\omega_n\sqrt{1-\zeta^2})t$$

$$= 1 + \frac{i(\zeta + i\sqrt{1-\zeta^2})}{2\sqrt{1-\zeta^2}} \cdot e^{-\zeta\omega_n t}(\cos\omega_n\sqrt{1-\zeta^2}\,t + i\sin\omega_n\sqrt{1-\zeta^2}\,t) +$$

$$\frac{i(-\zeta + i\sqrt{1-\zeta^2})}{2\sqrt{1-\zeta^2}} \cdot e^{-\zeta\omega_n t}(\cos\omega_n\sqrt{1-\zeta^2}\,t - i\sin\omega_n\sqrt{1-\zeta^2}\,t)$$

$$= 1 - e^{-\zeta\omega_n t}\left(\cos\omega_n\sqrt{1-\zeta^2}\,t + \frac{\zeta}{\sqrt{1-\zeta^2}}\sin\omega_n\sqrt{1-\zeta^2}\,t\right)$$

$$= 1 - \frac{e^{-\zeta\omega_n t}}{\sqrt{1-\zeta^2}}\sin(\omega_n\sqrt{1-\zeta^2}\,t + \psi),\ \psi = \cos^{-1}\zeta$$

Figure 23:
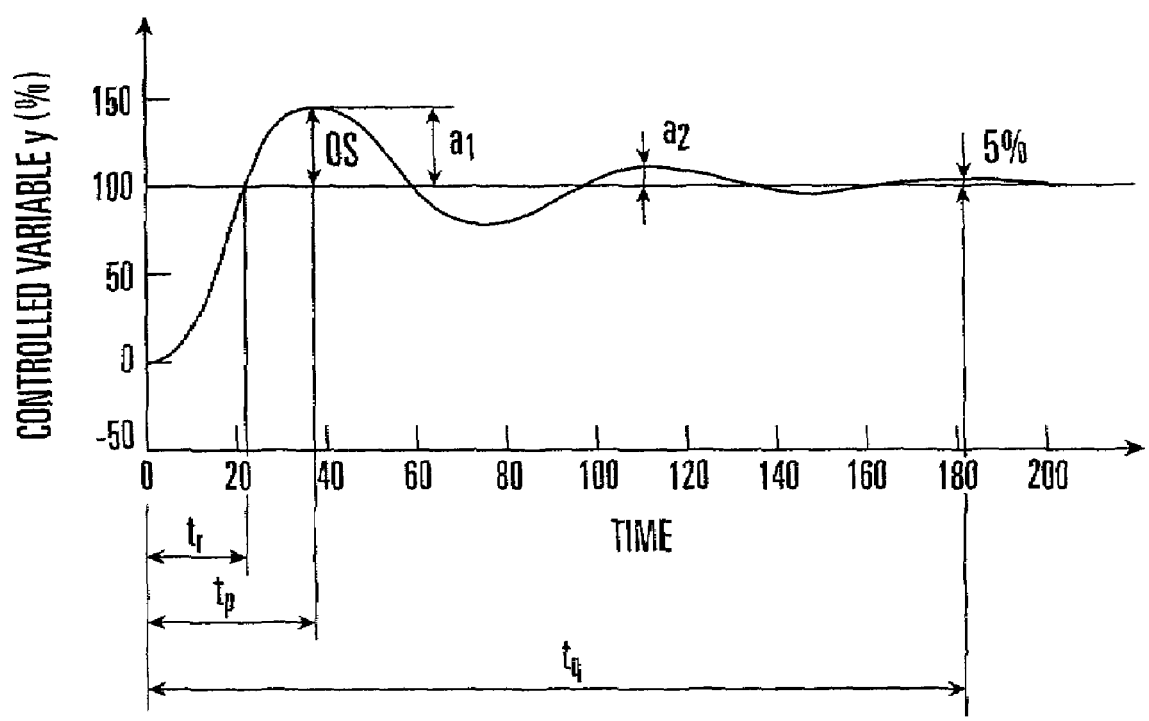
FIG. 23 is a graph showing the time response characteristic when the closed loop system is approximated by a second-order system.

One embodiment of the time response of the closed loop system as represented in the expression (140) is shown in FIG. 23. FIG. 23 shows how the controlled variable y behaves when a 100% step set value r is given at time 0. The parameters representing the typical transient response characteristic of the second-order system corresponding to this time response include a rise time $t_r$ for which the controlled variable y reaches the same value as the set value r (herein 100%), the overshoot OS that is an extreme value of the transient deviation firstly taken after the controlled variable y exceeds the set value r, the overshoot time $t_p$ for which the controlled variable y reaches the overshoot OS, the settling time $t_q$ for which the controlled variable y is contained within 5% of a range of the set value r, and the damping ratio DR that is the ratio of $a_1$ to $a_2$ as shown in FIG. 23. The rise time $t_r$ can be represented in the following expression, employing the damping coefficient $\zeta$ and the natural frequency $\omega_n$.

$$t_r = \frac{1}{\omega_n\sqrt{1-\zeta^2}}(\pi - \cos^{-1}\zeta) \tag{141}$$

Similarly, the overshoot time $t_p$ is indicated below.

$$t_p = \frac{\pi}{\omega_n\sqrt{1-\zeta^2}} \tag{142}$$

The settling time $t_q$ can be obtained in the following expression.

$$t_q = \frac{3}{\zeta\omega_n} \tag{143}$$

Also, the overshoot OS can be obtained in the following expression, employing the damping coefficient $\zeta$.

$$OS = \exp\left(\frac{-\zeta\pi}{\sqrt{1-\zeta^2}}\right) \tag{144}$$

And the damping ratio DR can be obtained in the following expression.

$$DR = a_2/a_1 = \exp(-2\pi\zeta/\sqrt{1-\zeta^2}) \tag{145}$$

From the expression (135), the transfer function $G_{yr}(s)$ of the closed loop system of FIG. 22 from the set value r to the controlled variable y can be obtained in the following expression.

$$G_{yr}(s) = \frac{\omega_n^2}{s^2 + 2\zeta\omega_n s + \omega_n^2} \tag{146}$$

If the frequency weight $W_{sL}'(s)$ is set in the following expression, as in the fifth embodiment, the expression (131) is satisfied, and the controller K can be designed in view of the set value followup characteristic.

$$W_{sL}'(s) = \frac{1}{S_{spec}(s)} = \frac{1}{G_{yr}(s) - 1} = \frac{1}{\frac{\omega_{nL}^2}{s^2 + 2\zeta_L\omega_{nL}s + \omega_{nL}^2} - 1} \tag{147}$$

In the expression (147), $\zeta_L$ is the damping coefficient for the L-th controlled variable $y_L$, and $\omega_{nL}$ is the natural frequency for the controlled variable $y_L$. The expression (147) can be transformed into the following expression.

$$W'_{sL}(s) = \frac{s^2 + 2\zeta_L \omega_{nL} s + \omega_{nL}^2}{s + a^2} \quad (148)$$
$$= \frac{s + a^2 = (s + 2\zeta_L \omega_{nL} s + \omega_{nL}^2)}{s} \cdot \frac{1}{(s + 2\zeta_L \omega_{nL})(s + a)}$$

The first term on the right side of the expression (148) is $\alpha^{-1}$ (s). Accordingly, the element $W_{sL}$ (s) of the sensitivity weight $W_s$ can be calculated in the following expression.

$$W_{sL}(s) = -\frac{s^2 + 2\zeta_L \omega_{nL} s + \omega_{nL}^2}{(s + 2\zeta_L \omega_{nL})(s + a)} \quad (149)$$

Substituting the expression (149), the expression (121) can be represented as follows:

$$W_s = \begin{bmatrix} -\frac{s^2 + 2\zeta_1 \omega_{n1} s + \omega_{n1}^2}{(s + 2\zeta_1 \omega_{n1})(s + a)} & 0 & \cdots & 0 \\ 0 & -\frac{s^2 + 2\zeta_2 \omega_{n2} s + \omega_{n2}^2}{(s + 2\zeta_2 \omega_{n2})(s + a)} & \cdots & 0 \\ \vdots & \vdots & \ddots & \vdots \\ 0 & 0 & \cdots & -\frac{s^2 + 2\zeta_L \omega_{nL} s + \omega_{nL}^2}{(s + 2\zeta_L \omega_{nL})(s + a)} \end{bmatrix} \quad (150)$$

To calculate the sensitivity weight $W_s$ employing the expression (150), it is required to obtain the damping coefficient $\zeta_L$ and the natural frequency $\omega_{nL}$. To obtain the damping coefficient $\zeta_L$ and the natural frequency $\omega_{nL}$, two items are selected from among the rise time $t_r$, the overshoot time $t_p$, the settling time $t_q$, the overshoot OS and the damping ratio DR, and the two selected parameter values are set. In this sixth embodiment, the method for calculating the damping coefficient $\zeta_L$ and the natural frequency $\omega_{nL}$, as one embodiment, will be described with an instance of employing the rise time $t_r$ and the overshoot OS. With the overshoot OS as indicated in the expression (144), the damping coefficient $\zeta_L$ can be obtained in the following expression.

$$\zeta_L = \sqrt{\frac{(\ln(OS_L))^2}{\pi^2 + (\ln(OS_L))^2}} \quad (151)$$

In the expression (151), $OS_L$ is the overshoot for the L-th controlled variable $y_L$. Also, from the rise time $t_r$ as indicated in the expression (141), the natural frequency $\omega_{nL}$ can be obtained in the following expression.

$$\omega_{nL} = \frac{\pi - \cos^{-1} \zeta_L}{t_{rL} \sqrt{1 - \zeta_L^2}} \quad (152)$$

In the expression (152), $t_{rL}$ is the rise time for the L-th controlled variable $y_L$. In this way, if the value of overshoot $OS_L$ is set, the damping coefficient $\zeta_L$ can be calculated from the expression (151), and if the value of the rise time $t_{rL}$ is set, the natural frequency $\omega_{nL}$ can be calculated from the expression (152). In the above way, the sensitivity weight $W_s$ can be determined.

In this sixth embodiment, the configuration of the design device is most the same as in the fifth embodiment. Thus, the operation of the design device of this sixth embodiment will be described below with reference to FIG. 15. The transient response parameters, i.e., the overshoot $OS_L$ and the rise time $t_{rL}$, are set into the transient response parameter input unit 101 by the user of the design device. This overshoot $OS_L$ and the rise time $t_{rL}$ are set for each controlled variable $y$. The transient response parameter registration unit 102 outputs the overshoot $OS_L$ and the rise time $t_{rL}$ input from transient response parameter input unit 101 directly to the closed loop transfer function calculation unit 103. The closed loop transfer function calculation unit 103 calculates the damping coefficient $\zeta_L$ and the natural frequency $\omega_{nL}$, based on the overshoot $OS_L$ and the rise time $t_{rL}$, employing the expressions (151) and (152). Substituting the damping coefficient $\zeta_L$ and the natural frequency $\omega_{nL}$ into the expression (146), the transfer function $G_{yr}(s)$ is calculated, and output to the frequency sensitivity weight calculation unit 104. Then, the frequency sensitivity weight calculation unit 104 calculates the sensitivity weight $W_s$, based on the transfer function $G_{yr}(s)$, employing the expressions (147) to (150), and outputs it to the controller calculation unit 105. The operation of the controller calculation unit 105 and the memory unit 106 is exactly the same as in the fifth embodiment. In this way, the controller K can be designed.

As described above, in this sixth embodiment, the degree of freedom in the design can be increased by approximating the transient response characteristic of the closed loop system with the second-order system characteristic, and the controller provided by the design device can have wider applicability. The first to sixth embodiments are involved with the design device which designs the multivariable controller. Also, the design device of the first to sixth embodiments can be implemented on the computer. That is, the computer is equipped with an operation unit, a storage device and an input/output device, and operates as the design device in accordance with the program.

INDUSTRIAL APPLICABILITY

As described above, the present invention is suitable for designing the multivariable controller.

The invention claimed is:
1. An apparatus comprising:
a design device for designing a controller in accordance with H infinity (H ∞) control logic, the design device employing generalized plants having control object models for manipulated variables, the device including:
storage means for storing said generalized plants;
parameter calculating means having:
setting means for setting a transient response characteristic of a closed loop system consisting of a control object model and said controller; and
frequency sensitivity weight calculation means for calculating the frequency sensitivity weight for determining a set value followup characteristic of said closed loop system in accordance with the transient response characteristic of said closed loop system; and
controller calculation means for deriving said controller by applying said frequency sensitivity weight to said generalized plants stored in said storage means, said setting means approximates the transient response characteristic of said closed loop system with a first-order lag characteristic.

2. The design device of controller according to claim 1, wherein said generalized plants have said control object model, and manipulated variable weight adjusting means for adjusting the input of manipulated variable into said control object model, which is provided in the former stage of said control object model, said parameter calculating means comprises frequency response calculation means for calculating the frequency response calculation means for calculating the frequency responses of said control object models, and scaling matrix calculation means for calculating a scaling matrix T for determining the weighting of said manipulated variables with said manipulated variable weight adjusting means in accordance with the frequency responses of said control object models so that the respective gains of said control object models are consistent, and said controller calculation means calculates the controller by applying said scaling matrix T to the manipulated variable weight adjusting means of said generalized plants stored in said storage means.

3. The design device of controller according to claim 2, wherein said scaling matrix calculation means calculates said scaling matrix T as follows:

$$T = \begin{bmatrix} T_1 & 0 & 0 & \cdots & 0 \\ 0 & T_2 & 0 & \cdots & 0 \\ 0 & 0 & T_3 & \cdots & 0 \\ \vdots & \vdots & \vdots & \ddots & \vdots \\ 0 & 0 & 0 & \cdots & T_N \end{bmatrix}$$

$$T_N = \frac{1}{L} \cdot \frac{\max(\|G_{y1u1}\|_\infty, \|G_{y1u2}\|_\infty, \cdots, \|G_{y1uN}\|_\infty)}{\|G_{y1uN}\|_\infty} + \frac{1}{L} \cdot \frac{\max(\|G_{y2u1}\|_\infty, \|G_{y2u2}\|_\infty, \cdots, \|G_{y2uN}\|_\infty)}{\|G_{y2uN}\|_\infty} + \cdots + \frac{1}{L} \cdot \frac{\max(\|G_{yLu1}\|_\infty, \|G_{yLu2}\|_\infty, \cdots, \|G_{yLuN}\|_\infty)}{\|G_{yLuN}\|_\infty}$$

where the number of manipulated variables u is N (N is a positive integer), the number of controlled variables y is L (L is a positive integer), and the H ∞ norm of the transfer function of said control object model from the N-th manipulated variable $u_N$ to the L-th controlled variable $y_L$ is $\|GyLuN\|\infty$.

4. The design device of controller according to claim 1, wherein said generalized plants have a first control object model for the manipulated variables, a second control object model for the disturbance, and manipulated variable weight adjusting means for adjusting the input of manipulated variable into the first control object mode, which is provided in the former stage of said first control object model, said parameter calculating means comprises frequency response calculation means for calculating the frequency responses of said first control object model and said second control object model, and scaling matrix calculation means for calculation a scaling matrix T for determining the weighting of the manipulated variables with said manipulated variable weight adjusting means in accordance with the frequency responses of said first and second control object models so that the respective gains of said first control object model are consistent with the maximum values of the gains of said second control object model, and said controller calculation means calculates the parameters of said controller by applying said scaling matrix T to the manipulated variable weight adjusting means of said generalized plants tored in said storage means.

5. The design device of controller according to claim 2, wherein the generalized plants stored in said storage means have control variable weight adjusint means for adjusting the controlled variable weight adjusting means for adjusting the controlled variables inside a closed loop system consisting of said manipulated variable weight adjusting means, the control object model and the controller, and said design device has setting means for setting a weight matrix S for determining the weighting of the controlled variables with said control variable weight adjusting means.

6. The design device of controller according to claim 4, wherein the generalized plants stored in said storage means have control variable weight adjusting means for adjusting the controlled variables inside a closed loop system consisting of said manipulated variable weight adjusting means, the first control object model and the controller, and said design device has setting means for setting a weight matrix S for determining the weighting of the controlled variables with said control variable weight adjusting means.

7. The design device of controller according to claim 2, wherein the generalized plants stored in said storage means have control variable weight adjusting means for adjusting the controlled variables in the former or later stage of frequency sensitivity weight adjusting means for determining the set value followup characteristic of a closed loop system consisting of said manipulated variable weight adjusting means, the control object model and the controller, and said design device has setting means for setting a weight matrix S for determining the weighting of the controlled variables with said control variable weight adjusting means.

8. The design device of controller according to claim 4, wherein the generalized plants stored in said storage means have control variable weight adjusting means for adjusting the controlled variables in the former or latter stage of freqeuncy sensitivity weight adjusting means for determing the set value followup characteristic of a closed loop system consisting of said manipulated variable weight adjusting means, the first control object model and the controller, and said design device has setting means for setting a weight matrix S for determining the weighting of the controlled variables with said control variable weight adjusting means.

9. The design device of controller according to claim 1, wherein said frequency sensitivity weight calculation unit calculates said frequency sensitivity weight in accordance with the transient response characteristic of said closed loop system, and a design index that the H ∞ norm of the transfer function of the closed loop system from the set value to the deviation multiplied by said frequency sensitivity weight is less than 1.

10. An apparatus comprising:
a design device for designing a controller in accordance with H infinity (H ∞) control logic, the design device employing generalized plants having control object models for manipulated variables, the device including:
storage means for storing said generalized plants;
parameter calculating means having:
setting means for setting a transient response characteristic of a closed loop system consisting of a control object model and said controller; and
frequency sensitivity weight calculation means for calculating the frequency sensitivity weight for determining a set value followup characteristic of said closed loop system in accordance with the transient response characteristic of said closed loop system; and controller calculation means for deriving said controller by applying said frequency sensitivity weight to said generalized plants stored in said storage means, wherein said setting means approximates the transient response characteristic of said closed loop system with a second-order system characteristic.

11. The design device of controller according to claim 4, wherein said scaling matrix calculation means calculates said scaling matrix T as follows:

$$T = \begin{bmatrix} T_1 & 0 & 0 & \cdots & 0 \\ 0 & T_2 & 0 & \cdots & 0 \\ 0 & 0 & T_3 & \cdots & 0 \\ \vdots & \vdots & \vdots & \ddots & \vdots \\ 0 & 0 & 0 & \cdots & T_N \end{bmatrix}$$

-continued $$T_N = \frac{1}{L} \cdot \frac{\max(\|G_{y1w1}\|_\infty, \|G_{y1w2}\|_\infty, \cdots, \|G_{y1wJ}\|_\infty)}{\|G_{y1uN}\|_\infty} + \frac{1}{L} \cdot \frac{\max(\|G_{y2w1}\|_\infty, \|G_{y2w2}\|_\infty, \cdots, \|G_{y2wJ}\|_\infty)}{\|G_{y2uN}\|_\infty} + \cdots + \frac{1}{L} \cdot \frac{\max(\|G_{yLw1}\|_\infty, \|G_{yLw2}\|_\infty, \cdots, \|G_{yLwJ}\|_\infty)}{\|G_{yLuN}\|_\infty}$$

where the number of manipulated variables u is N (N is a positive integer), the number of disturbance w is J (is a positive integer), the number of controlled variable y is L (L is a positive integer), the H ∞ norm of the transfer function of said first control object model from the N-th manipulated variable $u_N$ to the L-th controlled variable $y_L$ is $\|GyLuN\|\infty$.

* * * * *

UNITED STATES PATENT AND TRADEMARK OFFICE
CERTIFICATE OF CORRECTION

PATENT NO. : 7,092,856 B1  
APPLICATION NO. : 09/857482  
DATED : August 15, 2006  
INVENTOR(S) : Hojo et al.

Page 1 of 1

It is certified that error appears in the above-identified patent and that said Letters Patent is hereby corrected as shown below:

Col. 34, claim 7, line 4, please delete "later" and insert -- latter --.

Col. 36, claim 11, line 5-6, please delete "(is a positive integer)" and insert -- (J is a positive integer) --.

Signed and Sealed this

Twenty-eighth Day of August, 2007

JON W. DUDAS  
*Director of the United States Patent and Trademark Office*